(12) United States Patent
McKibben et al.

(10) Patent No.: US 7,925,246 B2
(45) Date of Patent: Apr. 12, 2011

(54) RADIO/TELEPHONY INTEROPERABILITY SYSTEM

(75) Inventors: Michael T McKibben, Columbus, OH (US); Jeffrey R. Lamb, Westerville, OH (US); Paul L Petronelli, San Jose, CA (US)

(73) Assignee: Leader Technologies, Inc., Lewis Center, OH (US)

( * ) Notice: Subject to any disclaimer, the term of this patent is extended or adjusted under 35 U.S.C. 154(b) by 1014 days.

(21) Appl. No.: 11/257,487

(22) Filed: Oct. 24, 2005

(65) Prior Publication Data

US 2006/0080344 A1    Apr. 13, 2006

Related U.S. Application Data

(63) Continuation-in-part of application No. 10/979,611, filed on Nov. 2, 2004, which is a continuation-in-part of application No. 10/731,906, filed on Dec. 10, 2003, now abandoned, and a continuation-in-part of application No. 10/732,744, filed on Dec. 10, 2003, now Pat. No. 7,139,761.

(60) Provisional application No. 60/621,704, filed on Oct. 25, 2004, provisional application No. 60/516,307, filed on Nov. 3, 2003, provisional application No. 60/432,257, filed on Dec. 11, 2002, provisional application No. 60/432,255, filed on Dec. 11, 2002.

(51) Int. Cl.
    *H04M 3/42* (2006.01)
(52) U.S. Cl. .................. 455/416; 455/404.1; 455/404.2; 455/403; 455/414.1; 370/260; 370/259; 370/261; 370/262
(58) Field of Classification Search ............... 455/414.1, 455/414.2, 521, 518, 519, 416, 404.1, 404.2, 455/403; 379/45, 37, 42; 370/260, 259, 261, 262

See application file for complete search history.

(56) References Cited

U.S. PATENT DOCUMENTS 4,714,989 A    12/1987    Billings
(Continued)

FOREIGN PATENT DOCUMENTS

WO    WO/00/06220    10/2000
(Continued)

OTHER PUBLICATIONS

Stephen Voida, et al., "Integrating Virtual and Physical Context to Support Knowledge Workers," IEEE Pervasive Computing, Sep. 2002, pp. 73-79, vol. 1, No. 3.

(Continued)

*Primary Examiner* — Ajit Patel
*Assistant Examiner* — Khai M Nguyen
(74) *Attorney, Agent, or Firm* — Taft Stettinius & Hollister LLP

(57) ABSTRACT

A radio/telephony interoperability architecture that facilitates intercommunications between a security services network, elected officials and/or emergency services network and a telephony management system for one-way and two-way security and/or emergency teleconferencing communications. The telephony system creates a session in which one or more session participants can communicate with front-line mobile radio operators (e.g., first responder personnel) and radio band components. Mobile radio systems can be accessed via circuit-switched and packet-switched networks with communications capable of existing between horizontal services entities (e.g., city fire and police) and vertical entities (e.g., city, state, and federal agencies and personnel). Furthermore, the presence of participants and potential participants is provided to authorized users to facilitate the establishment of such conferences. Notifications and alarms are used to alert participants and potential participants of important events.

5 Claims, 28 Drawing Sheets

U.S. PATENT DOCUMENTS

| | | | |
|---|---|---|---|
| 5,274,806 A | 12/1993 | Hill |
| 5,394,526 A | 2/1995 | Crouse et al. |
| 5,416,917 A | 5/1995 | Adair et al. |
| 5,495,607 A | 2/1996 | Pisello et al. |
| 5,530,857 A | 6/1996 | Gimza |
| 5,664,126 A | 9/1997 | Hirakawa et al. |
| 5,675,784 A | 10/1997 | Maxwell et al. |
| 5,678,042 A | 10/1997 | Pisello et al. |
| 5,680,615 A | 10/1997 | Marlin et al. |
| 5,699,526 A | 12/1997 | Siefert |
| 5,737,495 A | 4/1998 | Adams et al. |
| 5,740,424 A | 4/1998 | Wataya et al. |
| 5,758,351 A | 5/1998 | Gibson et al. |
| 5,761,661 A | 6/1998 | Coussens et al. |
| 5,765,155 A | 6/1998 | Nakamura |
| 5,778,370 A | 7/1998 | Emerson |
| 5,781,911 A | 7/1998 | Young et al. |
| 5,787,412 A | 7/1998 | Bosch et al. |
| 5,806,069 A | 9/1998 | Wakiyama et al. |
| 5,809,238 A | 9/1998 | Greenblatt et al. |
| 5,819,084 A | 10/1998 | Shapiro et al. |
| 5,826,265 A | 10/1998 | Van Huben et al. |
| 5,835,911 A | 11/1998 | Nakagawa et al. |
| 5,845,281 A | 12/1998 | Benson et al. |
| 5,852,810 A | 12/1998 | Sotiroff et al. |
| 5,859,972 A | 1/1999 | Subramaniam et al. |
| 5,862,325 A | 1/1999 | Reed et al. |
| 5,864,875 A | 1/1999 | Van Huben et al. |
| 5,870,746 A | 2/1999 | Knutson et al. |
| 5,873,083 A | 2/1999 | Jones et al. |
| 5,873,103 A | 2/1999 | Trede et al. |
| 5,887,171 A | 3/1999 | Tada et al. |
| 5,930,772 A | 7/1999 | Gomyo et al. |
| 5,930,801 A | 7/1999 | Falkenhainer et al. |
| 5,933,835 A | 8/1999 | Adams et al. |
| 5,940,829 A | 8/1999 | Tsuiki et al. |
| 5,950,201 A | 9/1999 | Van Huben et al. |
| 5,956,720 A | 9/1999 | Fernandez et al. |
| 5,956,728 A | 9/1999 | Federighi et al. |
| 5,956,732 A | 9/1999 | Tsuchida |
| 5,966,707 A | 10/1999 | Van Huben et al. |
| 5,978,779 A | 11/1999 | Stein et al. |
| 5,978,803 A | 11/1999 | Ooe |
| 5,978,804 A | 11/1999 | Dietzman |
| 6,026,402 A | 2/2000 | Vossen et al. |
| 6,026,403 A | 2/2000 | Siefert |
| 6,029,161 A | 2/2000 | Lang et al. |
| 6,029,174 A | 2/2000 | Sprenger et al. |
| 6,035,297 A | 3/2000 | Van Huben et al. |
| 6,041,325 A | 3/2000 | Shah et al. |
| 6,049,799 A | 4/2000 | Mangat et al. |
| 6,058,395 A | 5/2000 | Buzaglo et al. |
| 6,064,971 A | 5/2000 | Hartnett et al. |
| 6,065,009 A | 5/2000 | Leymann et al. |
| 6,065,014 A | 5/2000 | Wakio et al. |
| 6,067,549 A | 5/2000 | Smalley et al. |
| 6,073,109 A | 6/2000 | Flores et al. |
| 6,088,693 A | 7/2000 | Van Huben et al. |
| 6,088,706 A | 7/2000 | Hild |
| 6,088,717 A | 7/2000 | Reed et al. |
| 6,094,654 A | 7/2000 | Van Huben et al. |
| 6,094,675 A | 7/2000 | Sunaga et al. |
| 6,108,646 A | 8/2000 | Mohri et al. |
| 6,112,196 A | 8/2000 | Zimowski et al. |
| 6,119,149 A | 9/2000 | Notani |
| 6,128,626 A | 10/2000 | Beauchesne |
| 6,134,552 A | 10/2000 | Fritz et al. |
| 6,157,928 A | 12/2000 | Sprenger et al. |
| 6,157,929 A | 12/2000 | Zamiska et al. |
| 6,158,001 A | 12/2000 | Lee et al. |
| 6,161,146 A | 12/2000 | Kley et al. |
| 6,185,565 B1 | 2/2001 | Meubus et al. |
| 6,185,567 B1 | 2/2001 | Ratnaraj et al. |
| 6,205,480 B1 | 3/2001 | Broadhurst et al. |
| 6,216,124 B1 | 4/2001 | Wakio et al. |
| 6,223,177 B1 | 4/2001 | Tatham et al. |
| 6,223,219 B1 | 4/2001 | Uniacke et al. |
| 6,230,312 B1 | 5/2001 | Hunt |
| 6,233,577 B1 | 5/2001 | Ramasubramani et al. |
| 6,233,600 B1 | 5/2001 | Salas et al. |
| 6,236,994 B1 | 5/2001 | Swartz et al. |
| 6,240,415 B1 | 5/2001 | Blumberg |
| 6,240,416 B1 | 5/2001 | Immon et al. |
| 6,253,199 B1 | 6/2001 | Wakio et al. |
| 6,260,040 B1 | 7/2001 | Kauffman et al. |
| 6,263,330 B1 | 7/2001 | Bessette et al. |
| 6,263,342 B1 | 7/2001 | Chang et al. |
| 6,266,669 B1 | 7/2001 | Brodersen et al. |
| 6,269,380 B1 | 7/2001 | Terry et al. |
| 6,289,345 B1 | 9/2001 | Yasue |
| 6,289,384 B1 | 9/2001 | Whipple et al. |
| 6,289,385 B1 | 9/2001 | Whipple et al. |
| 6,289,460 B1 | 9/2001 | Hajmiragha |
| 6,292,796 B1 | 9/2001 | Drucker et al. |
| 6,292,830 B1 | 9/2001 | Taylor et al. |
| 6,298,347 B1 | 10/2001 | Wesley et al. |
| 6,308,175 B1 | 10/2001 | Lang et al. |
| 6,308,179 B1 | 10/2001 | Petersen et al. |
| 6,314,425 B1 | 11/2001 | Serbinis et al. |
| 6,321,231 B1 | 11/2001 | Jebens et al. |
| 6,327,594 B1 | 12/2001 | Van Huben et al. |
| 6,330,569 B1 | 12/2001 | Baisley et al. |
| 6,332,155 B1 | 12/2001 | Notani |
| 6,334,146 B1 | 12/2001 | Parasnis et al. |
| 6,336,099 B1 | 1/2002 | Barnett et al. |
| 6,339,771 B1 | 1/2002 | Zimowski et al. |
| 6,341,291 B1 | 1/2002 | Bentley et al. |
| 6,343,290 B1 | 1/2002 | Cossins et al. |
| 6,345,288 B1 | 2/2002 | Reed et al. |
| 6,351,761 B1 | 2/2002 | Cantone et al. |
| 6,353,819 B1 | 3/2002 | Edwards et al. |
| 6,353,820 B1 | 3/2002 | Edwards et al. |
| 6,356,893 B1 | 3/2002 | Itakura et al. |
| 6,356,909 B1 | 3/2002 | Spencer |
| 6,363,388 B1 | 3/2002 | Sprenger et al. |
| 6,370,538 B1 | 4/2002 | Lamping et al. |
| 6,374,236 B1 | 4/2002 | Chen et al. |
| 6,374,246 B1 | 4/2002 | Matsuo |
| 6,381,628 B1 | 4/2002 | Hunt |
| 6,381,735 B1 | 4/2002 | Hunt |
| 6,385,624 B1 | 5/2002 | Shinkai |
| 6,389,426 B1 | 5/2002 | Turnbull et al. |
| 6,389,538 B1 | 5/2002 | Gruse et al. |
| 6,389,589 B1 | 5/2002 | Mishra et al. |
| 6,393,421 B1 | 5/2002 | Paglin |
| 6,397,191 B1 | 5/2002 | Notani et al. |
| 6,397,192 B1 | 5/2002 | Notani et al. |
| 6,398,245 B1 | 6/2002 | Gruse et al. |
| 6,415,289 B1 | 7/2002 | Williams et al. |
| 6,418,421 B1 | 7/2002 | Hurtado et al. |
| 6,418,469 B1 | 7/2002 | Justice et al. |
| 6,434,403 B1 | 8/2002 | Ausems et al. |
| 6,434,562 B1 | 8/2002 | Pennywitt et al. |
| 6,434,682 B1 | 8/2002 | Ashton et al. |
| 6,434,745 B1 | 8/2002 | Conley et al. |
| 6,438,233 B1 | 8/2002 | Yoshimune et al. |
| 6,442,528 B1 | 8/2002 | Notani et al. |
| 6,446,071 B1 | 9/2002 | Callaway et al. |
| 6,446,089 B1 | 9/2002 | Brodersen et al. |
| 6,449,644 B1 | 9/2002 | Ryeng et al. |
| 6,477,533 B2 | 11/2002 | Schiff et al. |
| 6,484,156 B1 | 11/2002 | Gupta et al. |
| 6,484,177 B1 | 11/2002 | Van Huben et al. |
| 6,493,702 B1 | 12/2002 | Adar et al. |
| 6,496,828 B1 | 12/2002 | Cochrane et al. |
| 6,499,137 B1 | 12/2002 | Hunt |
| 6,505,196 B2 | 1/2003 | Drucker et al. |
| 6,516,316 B1 | 2/2003 | Ramsubramani et al. |
| 6,532,463 B1 | 3/2003 | Robbins et al. |
| 6,539,379 B1 | 3/2003 | Vora et al. |
| 6,539,399 B1 | 3/2003 | Hazama et al. |
| 6,542,515 B1 | 4/2003 | Kumar et al. |
| 6,542,932 B1 | 4/2003 | Brinnand et al. |
| 6,556,995 B1 | 4/2003 | Child et al. |
| 6,560,639 B1 | 5/2003 | Dan et al. |
| 6,564,261 B1 * | 5/2003 | Gudjonsson et al. ......... 709/227 |
| 6,567,783 B1 | 5/2003 | Notani et al. |

| Patent | Type | Date | Inventor |
|---|---|---|---|
| 6,567,808 | B1 | 5/2003 | Eschelbeck et al. |
| 6,574,628 | B1 | 6/2003 | Kahn et al. |
| 6,574,629 | B1 | 6/2003 | Cooke et al. |
| 6,574,654 | B1 | 6/2003 | Simmons et al. |
| 6,574,655 | B1 | 6/2003 | Libert et al. |
| 6,584,466 | B1 | 6/2003 | Serbinis et al. |
| 6,587,854 | B1 | 7/2003 | Guthrie et al. |
| 6,604,112 | B1 | 8/2003 | Taylor |
| 6,612,490 | B1 | 9/2003 | Herrendoerfer et al. |
| 6,615,213 | B1 | 9/2003 | Johnson |
| 6,629,123 | B1 | 9/2003 | Hunt |
| 6,633,867 | B1 | 10/2003 | Kraft et al. |
| 6,636,874 | B1 | 10/2003 | Douceur et al. |
| 6,643,641 | B1 | 11/2003 | Snyder |
| 6,647,396 | B2 | 11/2003 | Parnell et al. |
| 6,650,794 | B1 | 11/2003 | Aoki |
| 6,654,747 | B1 | 11/2003 | Van Huben et al. |
| 6,658,403 | B1 | 12/2003 | Kuroda et al. |
| 6,658,415 | B1 | 12/2003 | Brown et al. |
| 6,665,657 | B1 | 12/2003 | Dibachi |
| 6,665,658 | B1 | 12/2003 | DaCosta et al. |
| 6,665,675 | B1 | 12/2003 | Mitaru et al. |
| 6,675,176 | B1 | 1/2004 | Shinkai et al. |
| 6,675,179 | B2 | 1/2004 | Morohashi |
| 6,678,685 | B2 | 1/2004 | McGill et al. |
| 6,681,227 | B1 | 1/2004 | Kojima et al. |
| 6,681,229 | B1 | 1/2004 | Cason et al. |
| 6,684,212 | B1 | 1/2004 | Day et al. |
| 6,684,438 | B2 | 2/2004 | Brodersen et al. |
| 6,687,693 | B2 | 2/2004 | Cereghini et al. |
| 6,687,710 | B1 | 2/2004 | Dey |
| 6,691,113 | B1 | 2/2004 | Harrison et al. |
| 6,691,132 | B2 | 2/2004 | Walker et al. |
| 6,694,320 | B1 | 2/2004 | Ortiz et al. |
| 6,697,811 | B2 | 2/2004 | Brodsky |
| 6,697,821 | B2 | 2/2004 | Ziff et al. |
| 6,701,323 | B2 | 3/2004 | Sashino et al. |
| 6,718,347 | B1 | 4/2004 | Wilson |
| 6,718,361 | B1 | 4/2004 | Basani et al. |
| 6,721,726 | B1 | 4/2004 | Swaminathan et al. |
| 6,721,745 | B2 | 4/2004 | Monestere |
| 6,721,747 | B2 | 4/2004 | Lipkin |
| 6,732,148 | B1 | 5/2004 | Estrada et al. |
| 6,732,331 | B1 | 5/2004 | Alexander |
| 6,738,775 | B2 | 5/2004 | Asherman |
| 6,745,188 | B2 | 6/2004 | Bradburn |
| 6,751,613 | B1 | 6/2004 | Lee et al. |
| 6,754,681 | B2 | 6/2004 | Brodersen et al. |
| 6,757,720 | B1 | 6/2004 | Weschler |
| 6,760,730 | B1 | 7/2004 | Kataoka |
| 6,771,742 | B2 | 8/2004 | McCalmont et al. |
| 6,772,033 | B2 | 8/2004 | Scherer et al. |
| 6,772,178 | B2 | 8/2004 | Mandal et al. |
| 6,775,660 | B2 | 8/2004 | Lin et al. |
| 6,775,670 | B2 | 8/2004 | Bessette |
| 6,795,831 | B2 | 9/2004 | Hirose et al. |
| 6,807,542 | B2 | 10/2004 | Bantz et al. |
| 6,820,094 | B1 | 11/2004 | Ferguson et al. |
| 6,826,582 | B1 | 11/2004 | Chatterjee et al. |
| 6,826,596 | B1 | 11/2004 | Suzuki |
| 6,829,612 | B2 | 12/2004 | Neulight |
| 6,832,227 | B2 | 12/2004 | Seki et al. |
| 6,834,289 | B2 | 12/2004 | Kaneda et al. |
| 6,859,798 | B1 | 2/2005 | Bedell et al. |
| 6,871,279 | B2 | 3/2005 | Sames et al. |
| 6,873,997 | B1 | 3/2005 | Majjasie et al. |
| 6,874,003 | B2 | 3/2005 | Morohashi |
| 6,889,222 | B1 | 5/2005 | Zhao |
| 6,889,232 | B2 | 5/2005 | Pudipeddi et al. |
| 6,898,598 | B2 | 5/2005 | Himmel et al. |
| 6,898,609 | B2 | 5/2005 | Kerwin |
| 6,904,432 | B2 | 6/2005 | Charlot et al. |
| 6,912,522 | B2 | 6/2005 | Edgar |
| 6,917,962 | B1 | 7/2005 | Cannata et al. |
| 6,922,687 | B2 | 7/2005 | Vernon |
| 6,922,695 | B2 | 7/2005 | Skufca et al. |
| 6,925,462 | B2 | 8/2005 | Nishikawa et al. |
| 6,931,397 | B1 | 8/2005 | Sundaresan |
| 6,938,170 | B1 | 8/2005 | Kraft et al. |
| 6,941,307 | B2 | 9/2005 | Papanikolaou et al. |
| 6,941,313 | B2 | 9/2005 | Seliger et al. |
| 6,944,629 | B1 | 9/2005 | Shioi et al. |
| 6,944,662 | B2 | 9/2005 | Devine et al. |
| 6,954,757 | B2 | 10/2005 | Zargham et al. |
| 6,961,751 | B1 | 11/2005 | Bates et al. |
| 6,970,929 | B2 | 11/2005 | Bae et al. |
| 6,978,265 | B2 | 12/2005 | Schumacher |
| 6,983,311 | B1 | 1/2006 | Haitsuka et al. |
| 6,983,463 | B1 | 1/2006 | Hunt |
| 6,985,902 | B2 | 1/2006 | Wise et al. |
| 6,988,271 | B2 | 1/2006 | Hunt |
| 6,990,491 | B2 | 1/2006 | Dutta et al. |
| 7,000,235 | B2 | 2/2006 | Mandal et al. |
| 7,010,538 | B1 | 3/2006 | Black |
| 7,016,901 | B2 | 3/2006 | Eikenbery |
| 7,020,653 | B2 | 3/2006 | Idicula et al. |
| 7,020,753 | B2 | 3/2006 | Shanahan et al. |
| 7,024,425 | B2 | 4/2006 | Krishnaprasad et al. |
| 7,028,032 | B1 | 4/2006 | Diedrich et al. |
| 7,028,079 | B2 | 4/2006 | Mastrianni et al. |
| 7,031,968 | B2 | 4/2006 | Kremer et al. |
| 7,035,837 | B2 | 4/2006 | Reulein et al. |
| 7,035,840 | B2 | 4/2006 | Nakos et al. |
| 7,036,149 | B2 | 4/2006 | Sonoda et al. |
| 7,039,597 | B1 | 5/2006 | Notani et al. |
| 7,039,626 | B2 | 5/2006 | Hirata |
| 7,039,640 | B2 | 5/2006 | Miller et al. |
| 7,043,490 | B2 | 5/2006 | Choy et al. |
| 7,051,031 | B2 | 5/2006 | Schein |
| 7,051,039 | B1 | 5/2006 | Murthy et al. |
| 7,054,890 | B2 | 5/2006 | Musante et al. |
| 7,058,600 | B1 | 6/2006 | Combar et al. |
| 7,058,627 | B2 | 6/2006 | Wiesler et al. |
| 7,062,532 | B1 | 6/2006 | Sweat et al. |
| 7,069,242 | B1 | 6/2006 | Sheth et al. |
| 7,069,271 | B1 | 6/2006 | Fadel et al. |
| 7,069,511 | B2 | 6/2006 | Martizen et al. |
| 7,072,894 | B2 | 7/2006 | Loy et al. |
| 7,085,764 | B2 | 8/2006 | Bangal et al. |
| 7,089,278 | B1 | 8/2006 | Churchill et al. |
| 7,092,944 | B2 | 8/2006 | Fukuta et al. |
| 7,092,958 | B2 | 8/2006 | Hempstead et al. |
| 7,092,969 | B2 | 8/2006 | Meek et al. |
| 7,096,222 | B2 | 8/2006 | Kern et al. |
| 7,099,885 | B2 | 8/2006 | Hellman et al. |
| 7,107,268 | B1 | 9/2006 | Zawadzki et al. |
| 7,111,291 | B2 | 9/2006 | Loy et al. |
| 7,113,883 | B1 | 9/2006 | House et al. |
| 7,113,946 | B2 | 9/2006 | Cosic |
| 7,113,999 | B2 | 9/2006 | Pestoni et al. |
| 7,118,024 | B1 | 10/2006 | Hoshino |
| 7,120,632 | B2 | 10/2006 | Helmbrecht et al. |
| 7,127,501 | B1 | 10/2006 | Beir et al. |
| 7,130,858 | B2 | 10/2006 | Ciaramitaro et al. |
| 7,134,135 | B2 | 11/2006 | Cerami et al. |
| 7,136,858 | B2 | 11/2006 | Malik et al. |
| 7,136,912 | B2 | 11/2006 | Hotti |
| 7,139,761 | B2 | 11/2006 | McKibben et al. |
| 7,146,407 | B2 | 12/2006 | McNulty et al. |
| 7,152,080 | B2 | 12/2006 | Mikami |
| 7,155,426 | B2 | 12/2006 | Al-Azzawe |
| 7,155,461 | B2 | 12/2006 | Miyata et al. |
| 7,162,477 | B1 | 1/2007 | Mukherjee |
| 7,162,537 | B1 | 1/2007 | Kathail |
| 7,165,060 | B2 | 1/2007 | Foster et al. |
| 7,171,411 | B1 | 1/2007 | Lewis et al. |
| 7,181,441 | B2 | 2/2007 | Mandato et al. |
| 7,181,455 | B2 | 2/2007 | Wookey et al. |
| 7,181,507 | B1 | 2/2007 | Lavelle et al. |
| 7,185,317 | B2 | 2/2007 | Fish et al. |
| 7,194,470 | B2 | 3/2007 | Miyawaki et al. |
| 7,200,638 | B2 | 4/2007 | Lake |
| 7,203,927 | B2 | 4/2007 | Al-Azzawe et al. |
| 7,211,980 | B1 | 5/2007 | Bruemmer et al. |
| 7,224,778 | B2 | 5/2007 | Aoki |
| 7,225,183 | B2 | 5/2007 | Gardner |
| 7,231,378 | B2 | 6/2007 | Lawson et al. |
| 7,231,407 | B2 | 6/2007 | Brodersen et al. |

| | | |
|---|---|---|
| 7,237,002 B1 | 6/2007 | Estrada et al. |
| 7,239,409 B2 | 7/2007 | Parry |
| 7,243,138 B1 | 7/2007 | Majkut et al. |
| 7,246,130 B2 | 7/2007 | Goodwin et al. |
| 7,249,143 B1 | 7/2007 | Bhatia |
| 7,257,581 B1 | 8/2007 | Steele et al. |
| 7,257,767 B1 | 8/2007 | Carden, Jr. |
| 7,260,638 B2 | 8/2007 | Crosbie |
| 7,269,579 B2 | 9/2007 | Lovegren et al. |
| 7,269,604 B2 | 9/2007 | Moore et al. |
| 7,269,625 B1 | 9/2007 | Willhide et al. |
| 7,277,897 B2 | 10/2007 | Bamford et al. |
| 7,346,648 B1 | 3/2008 | Seliger |
| 7,366,990 B2 | 4/2008 | Pitroda |
| 7,437,312 B2 | 10/2008 | Bhatia et al. |
| 2003/0208459 A1 | 11/2003 | Shea et al. |
| 2003/0217096 A1* | 11/2003 | McKelvie et al. ............ 709/202 |
| 2005/0041602 A1* | 2/2005 | West et al. .................... 370/260 |
| 2006/0069726 A1 | 3/2006 | McKibben et al. |
| 2007/0058573 A1* | 3/2007 | Schwagmann et al. ....... 370/260 |
| 2007/0130599 A1* | 6/2007 | Monroe ........................ 725/105 |
| 2010/0273445 A1* | 10/2010 | Dunn et al. ................ 455/404.1 |

FOREIGN PATENT DOCUMENTS

WO PCT/US2008/001576    8/2008

OTHER PUBLICATIONS

Dave Banks, et al., "The ePerson Snippet Manager: a Semantic Web Application," Hewlett Packard Publication: HPL-2002-328, Nov. 27, 2002.

Bianco, Matthew, "An Interface for the Visualization and Manipulation of Asynchronous Collaborative Work within the DISCIPLE System," Graduate Thesis, Jan. 2002.

Paul Dourish, et al, Presto: An Experimental Architecture for Fluid Interactive Document Spaces, ACM Transactions on Computer-Human Interaction, vol. 6-2, 133-61, Jun. 30, 1999.

Paul Dourish, et al., Extending Document Management Systems with User-Specific Active Properties, ACM Transactions on Information Systems, vol. 18-2, 140-70, Apr. 30, 2000.

Marlon Pierce, et al., Interoperable Web Services for Computational Portals, Proceedings of the 2002 ACM/IEEE Conference on Supercomputing, Nov. 22, 2002.

John December, The World Wide Web Unleashed (2d ed. 1995), pp. 329-33.

* cited by examiner

RADIO/TELEPHONY INTEROPERABILITY SYSTEM

CROSS-REFERENCE TO RELATED APPLICATIONS

This application claims the benefit of U.S. Provisional Patent Application Ser. No. 60/621,858 entitled "RADIO/TELEPHONY INTEROPERABILITY SYSTEM FOR EMERGENCY SERVICES" and filed Oct. 25, 2004. This application is also a Continuation-in-Part of U.S. patent application Ser. No. 10/979,611 entitled "COMMUNICATION SYSTEM AND METHOD", filed Nov. 2, 2004, which claims the benefit of U.S. Provisional Patent Application Ser. No. 60/516,307 entitled "COMMUNICATION SYSTEM AND METHOD" and filed Nov. 3, 2003. The entireties of the above-noted applications are incorporated by reference herein.

TECHNICAL FIELD

This invention is related to web-supported teleconferencing systems, and more specifically, to interfacing such teleconferencing systems to mobile radio systems for communications with elected officials and first responder emergency communications, for example.

BACKGROUND

The advent of global communications networks such as the Internet has facilitated numerous collaborative enterprises. In addition to basic e-mail exchanges and intercommunications, such communications networks offer the opportunities to provide communications arrangements (e.g., voice conferencing, video conferencing, the combination of which plus multimedia that can be exchanged during a session are referred to herein as teleconferencing) whereby many customers can be bridged together on a media connection. Individuals and business people seek to communicate with each other, obtain useful information, interact commercially and entertain themselves in an increasingly mobile society. In order to fulfill these needs, one requires the capability to send and receive messages, access information and entertainment content, conduct business transactions, organize daily schedules and generally, stay in touch with homes and offices from almost anywhere, at any time, as easily as making a telephone call.

The challenge of communications interoperability has plagued public safety agencies. Such interoperability can give first responders, elected officials and public safety agencies the capability to exchange voice and data on-demand and in real time, when needed and as authorized. However, national security incidents (e.g., terrorist attacks, bombings, . . . ) and natural disasters (e.g., hurricanes, earthquakes, floods, . . . ) have exposed that true interoperability requires first responders and elected officials to be able to communicate not just within their units, but also across disciplines and jurisdictions. Additionally, full communications interoperability is required at all levels, for example, at the local, state, and federal levels.

Conventional network availability has proven to be difficult to maintain in unpredictable environments such as firestorms, natural disasters, and terrorist situations. Too often communications depend on access to fixed or temporary infrastructure and are limited by range or line-of-sight constraints. Moreover, radio interoperability between jurisdictions (e.g., local, state, federal) is always an issue for responders and has become a homeland security matter. Furthermore, proprietary radios and multiple standards and their lack of interoperability with wired and wireless telephony (also called telecommunications) networks make it virtually impossible for different agencies to cooperate in a scaled response to a major disaster.

The ability to determine if a first responder is on the net or available, i.e. "presence" is critical to the successful execution of any crises management situation. This concept is particularly difficult to implement, enforce and manage for radio networks.

Accordingly, reliable wireless and/or wired communications that enable real-time information sharing, constant availability, and interagency interoperability are imperative in emergency situations. Additionally, greater situational awareness is an increasingly important requirement that enables emergency first responders to know each other's position in relation to the incident, terrain, neighborhood, or perimeter being secured. Live video, voice communication, sensor, and location data provide mission-critical information, but low-speed data networks cannot meet the bandwidth requirements to support such critical real-time information.

When catastrophic emergencies happen, a comprehensive coordinated effort based on timely, effective communications between fire, police, emergency services and/or elected officials is necessary to cope with the situation. Therefore, what is needed is an improved interoperable emergency and security communications architecture. In addition, this architecture should embody services that support presence as well as notification and alarm transmission.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Disclosed herein is a radio/telephony interoperability architecture that facilitates intercommunications between a security and/or emergency services network and a telephony management component for one-way and two-way security and/or emergency teleconferencing communications. The telephony management component creates a session in which one or more session participants can communicate with front-line mobile radio operators (e.g., first responder personnel) and radio band components. Mobile radio systems can be accessed via circuit-switched and/or packet-switched networks with communications capable of existing between horizontal services entities (e.g., city fire and police) and vertical entities (e.g., city, state, and federal agencies and personnel).

Accordingly, the invention disclosed and claimed herein, in one aspect thereof, comprises a system that facilitates security and/or emergency services communications. The system can include an emergency communications network component that facilitates at least emergency mobile radio communications, and an Internet-based communications management component that interfaces to the emergency communication networks to facilitate intercommunications therebetween. Note that although called an Internet-based component, it is to be understood that the network can be any IP-based network. The Internet-based communications management component can communicate at least via VoIP (Voice over Internet Protocol). The emergency communications network component facilitates communications to at least one of wired and wireless telephone communications systems. The Internet-based communications management component can communicate emergency services information to a group of conference call participants via a single PIN (Participant Identification Number).

In another aspect thereof, the Internet-based communications management component facilitates one-way and two-way communications, where the one-way communications can be for emergency alerts, and the two-way communications can be for teleconferencing, for example.

In another aspect of the subject invention, the system further comprises an artificial intelligence component that employs a probabilistic and/or statistical-based analysis to prognose or infer an action that a user desires to be automatically performed.

In yet another novel aspect, presence data can be detected and processed to determine if a user (e.g., mobile radio user) is available and in a certain area.

In still another novel aspect, Automatic Speech Recognition (ASR) can be employed in the dialog with participants on a mobile radio network who do not have handsets equipped with DTMF (dual tone multi-frequency) keys.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
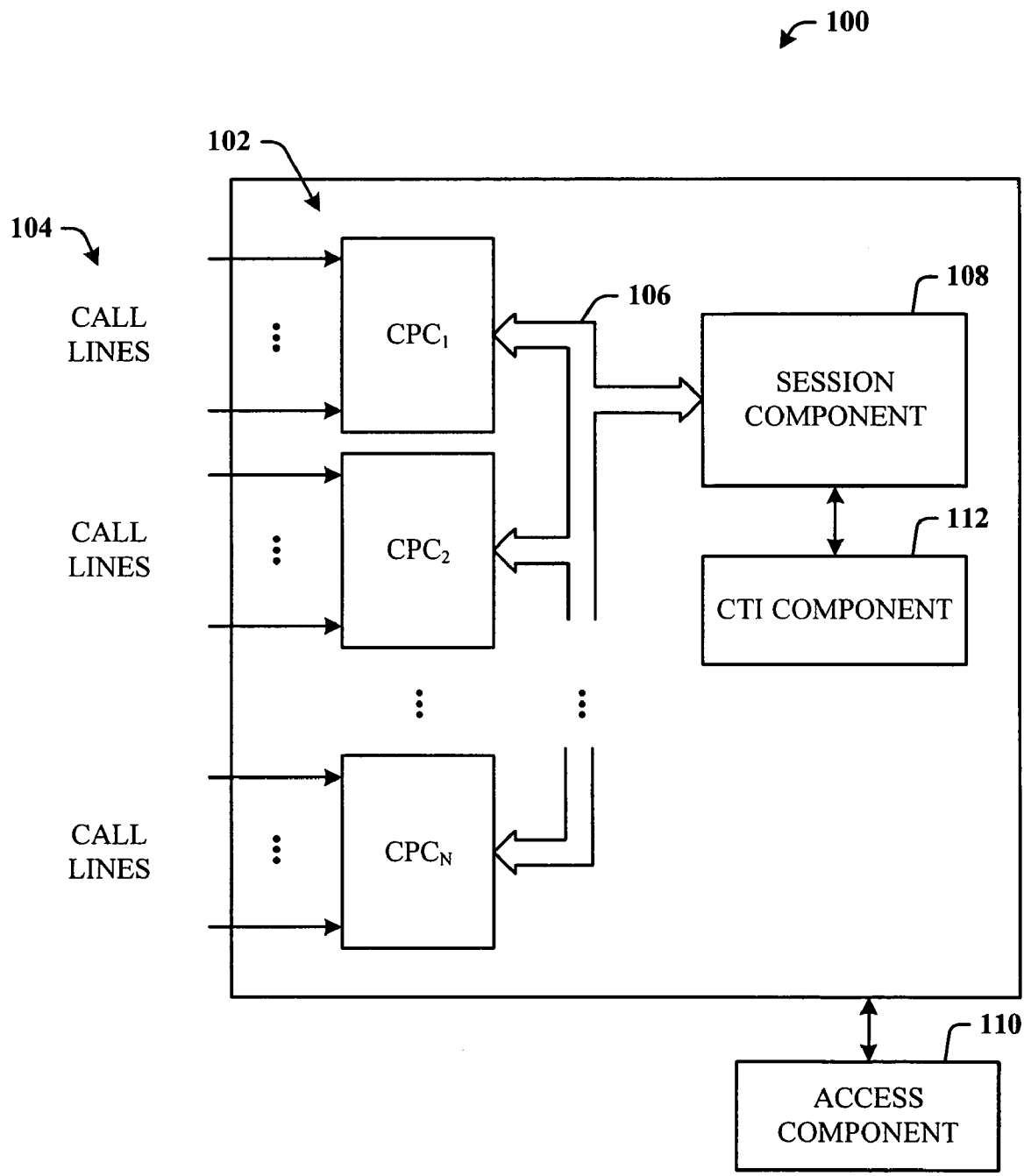
FIG. 1 illustrates a call session system in accordance with the subject invention.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to FIG. 1, there is illustrated a call session system 100 in accordance with the subject invention. The system 100 includes one or more call processing components 102 (denoted $CPC_1$, $CPC_2$, ..., $CPC_N$) that provide the capability to receive and transmit calls via call lines 104 (e.g., as provided by digital T1 and E1 communications architectures), and process signals and data for at least the management of call conferencing. The one or more call processing components 102 intercommunicate control signals and data across a non-voice communications bus 106. In accordance with a novel aspect of the subject invention, a session component 108 resides on the bus 106 in communication with the one or more call processing components 102 to facilitate routing of one or more of the calls across the non-voice communications bus 106, which is a departure from the designed purpose of the bus 106.

The session component 108 bridges the one or more call processing components 102 across the bus 106 in such a way that is significantly more efficient and allows for dynamic assignment of ports across the multiple cards at the time of receiving or initiating a call. Conventionally, software is written to allocate an assigned port for a received call, and use that port until the call is finished. In the system of the invention, the system does not even consider which port to allocate until the call starts, allocates the first available port, and dynamically allocates more or less ports as the demand increases and decreases. During the session, the system knows which ports are being used, and at the end of the session, releases the ports back into the pool of ports to be re-utilized.

In support of call management, the session component 108 can manage a single call across processing resources (e.g., DSP—digital signal processor resources) of at least two of the CPCs (e.g., $CPC_1$ and $CPC_2$). Additional features of echo cancellation, noise reduction, volume control, etc., are facilitated by dedicating some of the DSP resources of the CPCs for these purposes. It is within contemplation of the subject invention that other functions can be dedicated to additional DSP resources where suitable code is provided.

The system 100 also includes an access component 110 that facilitates user interaction with features provided in code by the session component 108. The system 100 exposes itself as a network-based API (application program interface) that facilitates processing of general functions, for example, "dial this number", "play this .wav file on this line", "bind this line into this conference call", and "create a new conference call." In contrast, the session component 108 manages the ports and DSP resources as one large entity of ports and resources.

The session component 108 interfaces to a CTI (computer telephony interface) component 112 that exposes itself as a remote Java™ API to which the access component 110 interfaces. Thus, the graphical user interface provided by a browser interfaces to the CTI component 112, and not to the session component 108 and underlying hardware and software. Note that although the CTI component 112 is shown internal to the system 100, it can be implemented as a separate entity external to the system 100, as hosted on a personal computer, for example.

The bus 106 is a secondary bus that typically handles signals and data, and which are non-voice communications. One example of the communications architecture employed by the bus 106 is an MVIP (multi-vendor integration protocol) architecture. Another more recent enhancement to the MVIP architecture provides the basis for H.100 bus and H.110 bus architectures, such as found on a model AG4000C board, and other suitable boards manufactured by NMS Communications, of Framingham, Mass.

Figure 2:
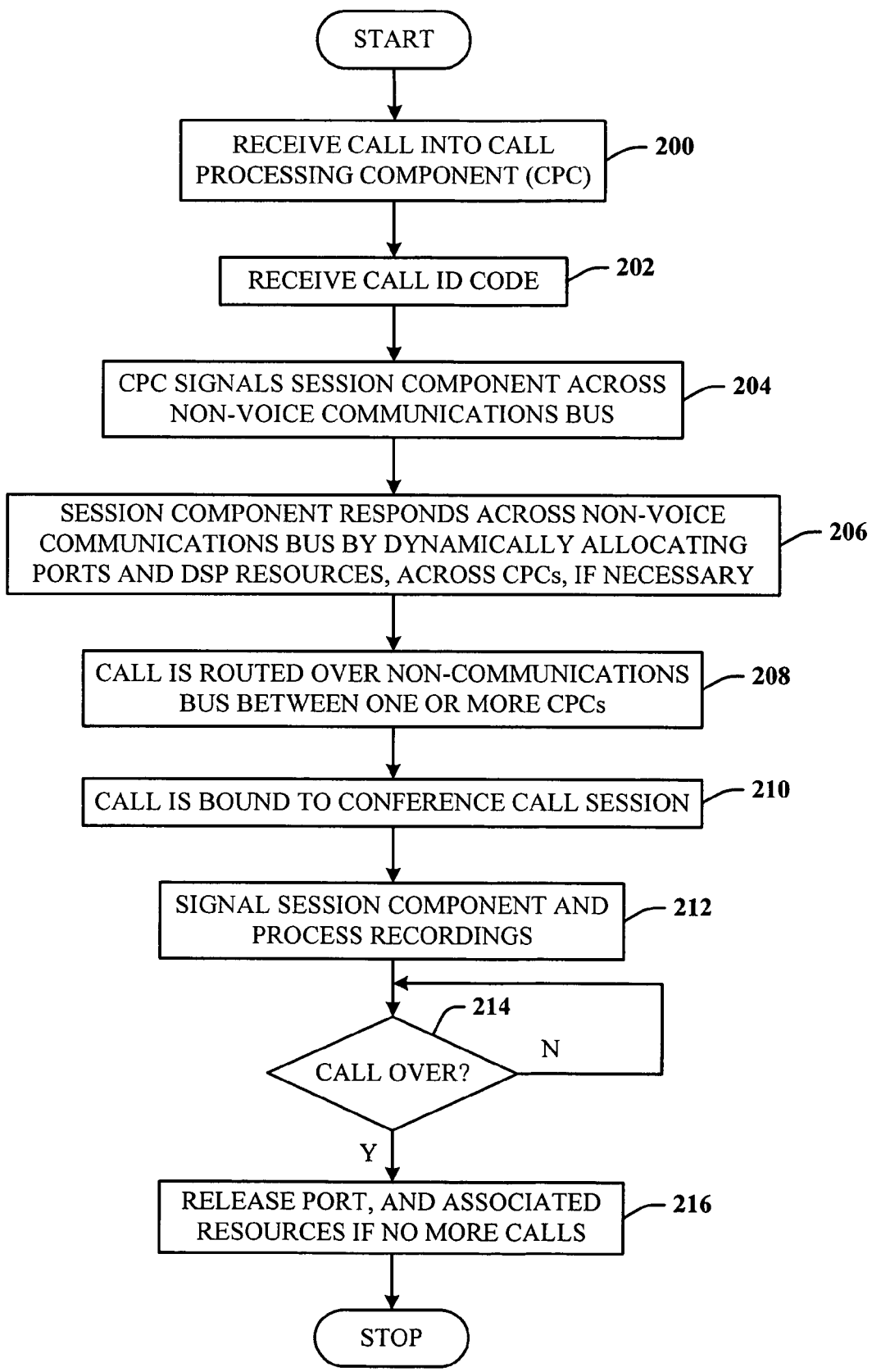
FIG. 2 illustrates a methodology of call conferencing in accordance with the invention.

Referring now to FIG. 2, there is illustrated a methodology of call conferencing in accordance with the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 200, a call is received at a CPC. The user, in accordance with the invention, also provides an ID, as indicated at 202. This can be a participant ID that indicates the caller is a participant in a conference call session, or a host ID that indicates the caller will be the host of the conference call. At 204, the CPC that received the call signals the session component across the non-voice communications bus. At 206, the session component responds across the non-voice communications bus by dynamically allocating ports and DSP resources, across CPCs, if necessary. If necessary, at 208, the call is routed over the non-voice communications bus to be processed by the assigned resources on a different CPC than the one that received the call. At 210, the call is bound to a conference call session. At 212, the session component is signaled with respect to one or more recordings that can be played in association with the call. At 214, the system checks if the call is over. If no, flow loops back to keep checking. If yes, at 216, the session component disconnects the call and releases the associated port. If the call is the last of the session, the associated DSP resources will also be released for reassignment to another call session.

Figure 3:
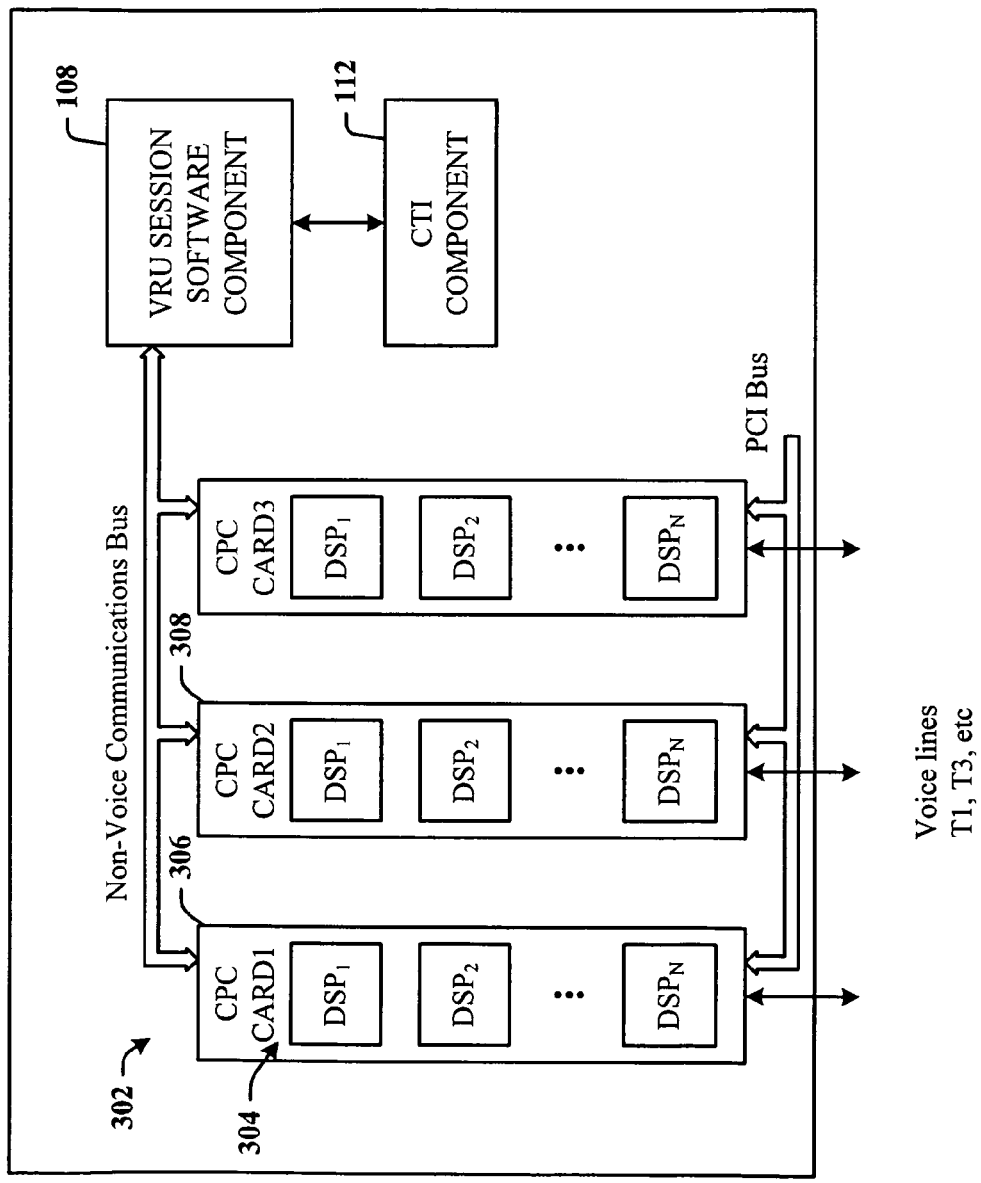
FIG. 3 illustrates more detailed system diagram of the telephone call processing system of the subject invention.

Referring now to FIG. 3, there is illustrated more detailed system diagram of the telephone call processing system 300 of the subject invention. The system 300 (similar to system 100 of FIG. 1) receives incoming calls over voice lines, such as T1 and E1 digital communications connections. One or more separate lines can be provided for each CPC card 302 (denoted here as CPC Card1, CPC Card2, and CPC Card3). Each of the CPC cards 302 includes DSP resources 304 (represented as DSP blocks $DSP_1$, $DSP_2$, ..., $DSP_N$) to which an incoming call is assigned for processing. In accordance with the subject invention, each of the DSP resources 304 is allocated to perform same or different tasks. For example, a first DSP resource ($DSP_1$) can be allocated for echo cancellation, a second DSP resource ($DSP_2$) can be allocated for volume control, and a third DSP (not shown) can be allocated for noise reduction, all of which are associated with one or more calls.

The allocation of such DSP resources 304 is accomplished by the session software component 108 (designated as the VRU—voice response unit) that communicates associated commands across the non-voice communications bus to the respective CPC cards 302. Moreover, a call received at a first CPC card 306 can be routed across to a second CPC card 308, via the non-voice communications bus. Thus, the burden of call processing can be scaled to another card. Ultimately, all CPC processing cards and incoming voice lines appear to be one large bound conference-calling platform.

The CTI component 112 facilitates interfacing to the system 300 such that high level commands can be processed and communicated to the session component 108 for execution across the non-voice communications bus 106 to the CPC cards 302.

At a higher level, the many call conferencing benefits and functions can be performed in accordance with the system 300 of the subject invention. A user can interface to the system 300 to facilitate a conference call, by initiating contact with prospective participants, binding callers to a specific conference call session, muting, disconnecting, and performing many other functions in accordance with the subject invention.

Figure 4:
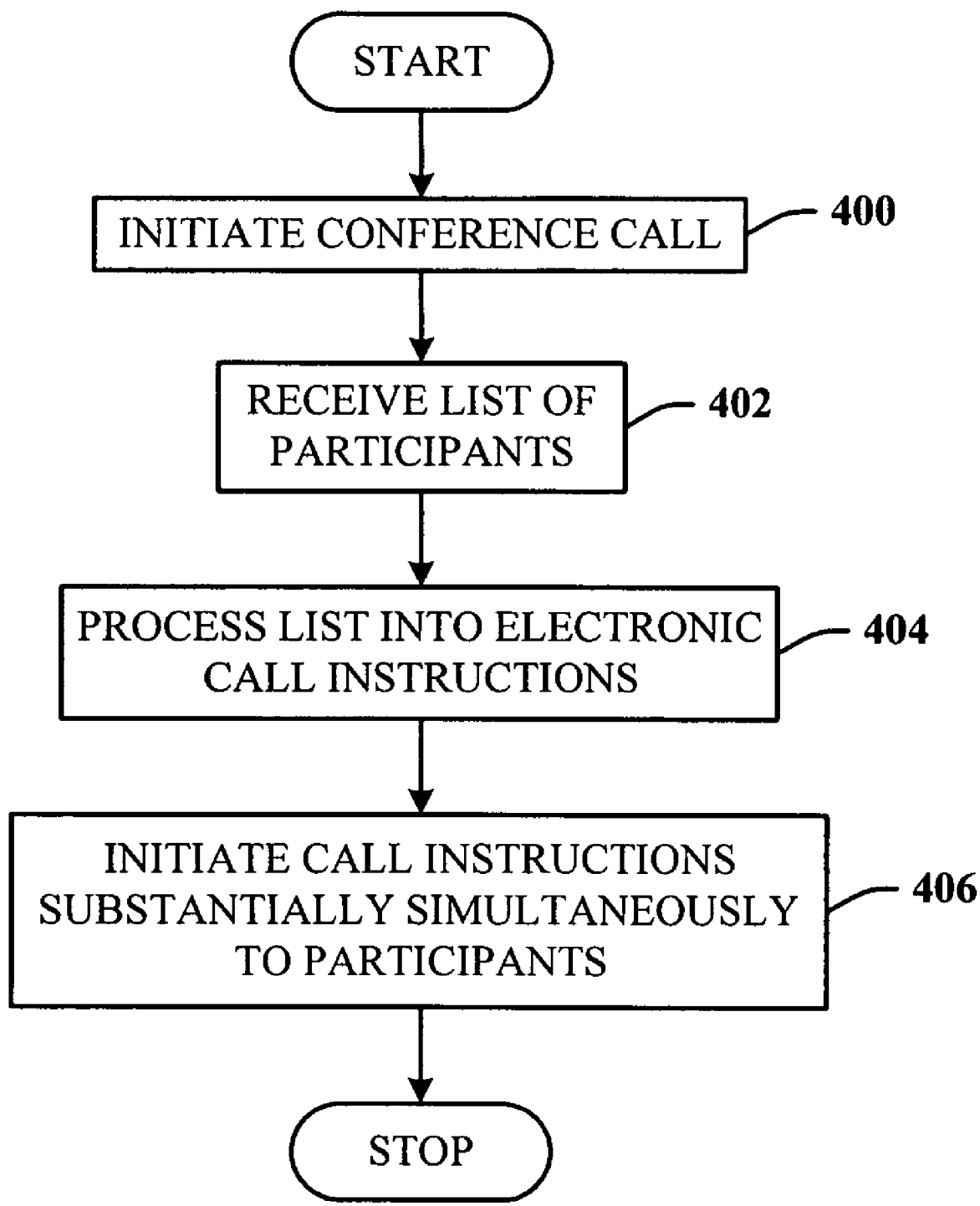
FIG. 4 illustrates a methodology of performing call conferencing in accordance with the invention.

Referring now to FIG. 4, there is illustrated a methodology of performing call conferencing in accordance with the invention. The system is capable of simultaneously dialing several participants at once and binding them to a conference call. Accordingly, at 400, a conference call session is initiated. At 402, a list of participants is received. At 404, the list is processed into electronic call instructions. At 406, the call instructions are processed to initiate calls substantially simultaneously to all participants on the list.

Figure 5:
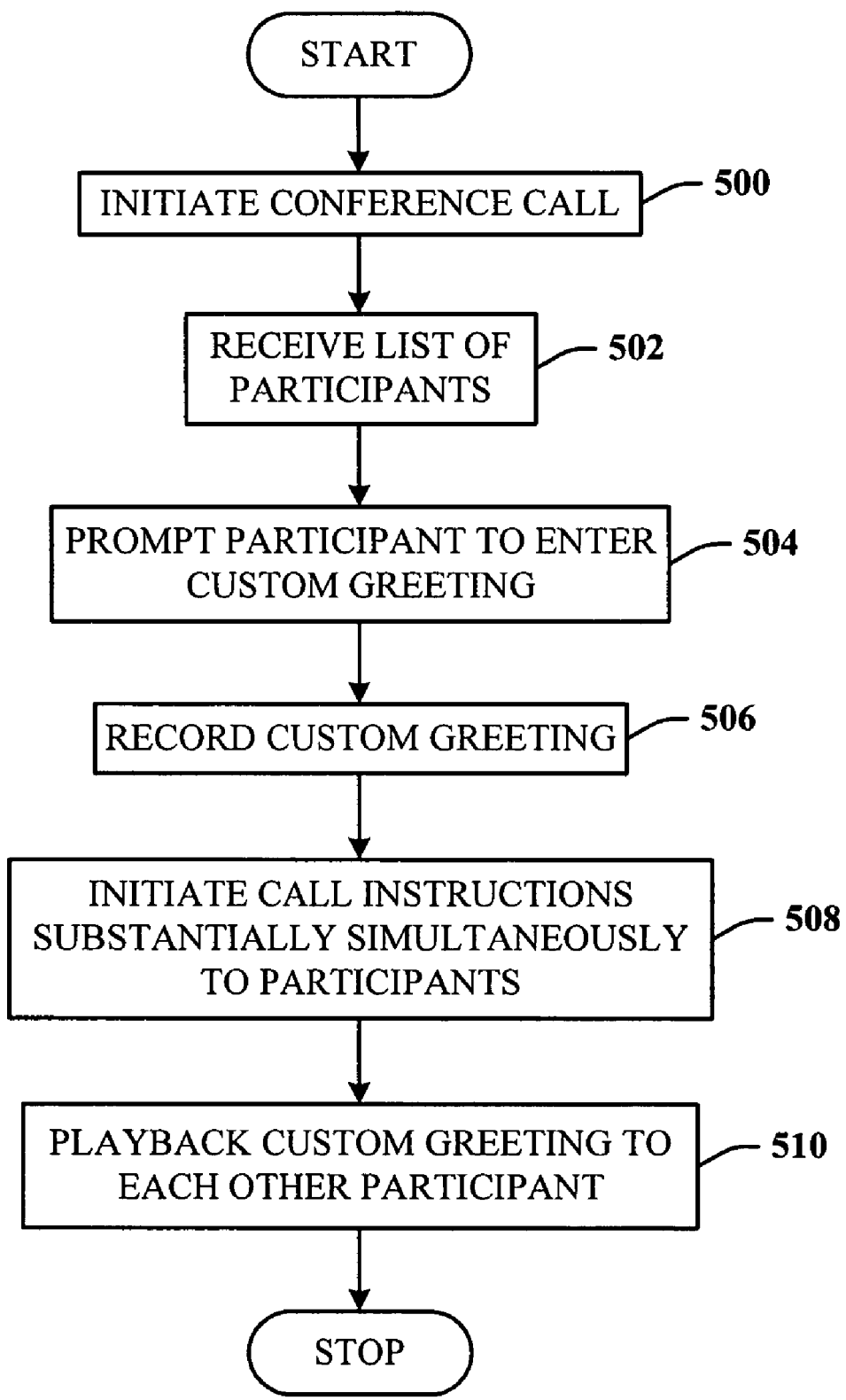
FIG. 5 illustrates a methodology of processing greetings in accordance with the invention.

Referring now to FIG. 5, there is illustrated a methodology of processing greetings in accordance with the invention. The software is also capable of calling a conference call host (referred to herein as a "hosted" conference call session), prompting the host for a custom greeting, recording the custom greeting, and replaying the custom greeting to other participants invited to the conference call. Accordingly, at 500, a conference call session is initiated. At 502, a list of participants is received and processed. At 504, a host is called and prompted to enter a custom greeting. At 506, the custom greeting is input by the host and stored. At 508, call instructions are initiated substantially simultaneously to all participants. At 510, the custom greeting is played back to the session participants who are then logged in to the session. Where a host is not designated, this is referred to herein as a "non-hosted" conference call session.

Figure 6:
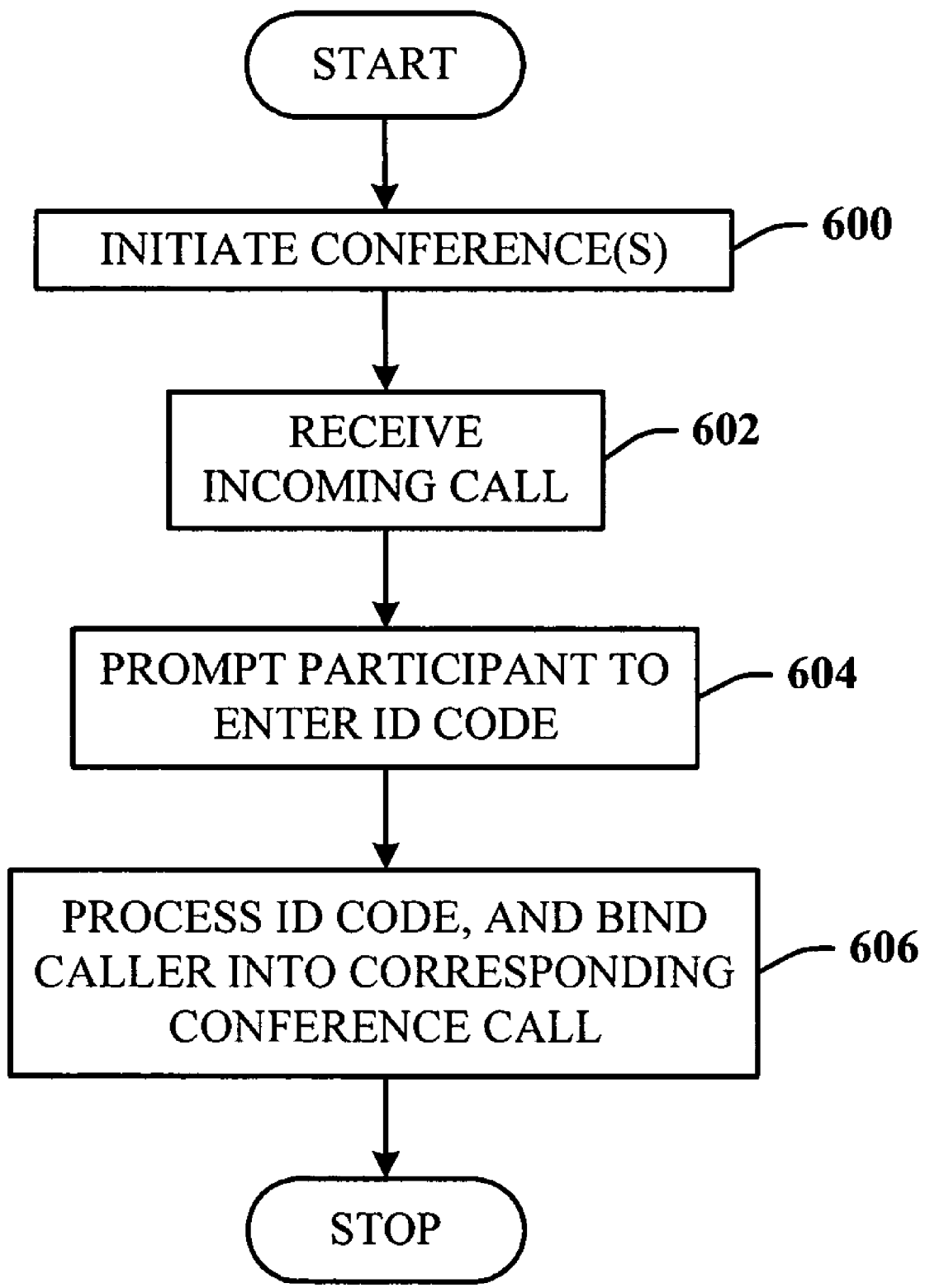
FIG. 6 illustrates a methodology of connecting a conference participant to the appropriate conference call session in accordance with the invention.

Referring now to FIG. 6, there is illustrated a methodology of connecting a conference participant to the appropriate conference call session in accordance with the invention. At 600, several conference call sessions have been initiated and/or are in session. At 602, the system receives an incoming call of a session participant. At 604, the system prompts the caller to enter an ID code. At 606, the system processes the ID code, and binds the caller as a participant into the conference call session that corresponds to the ID code.

Figure 7:
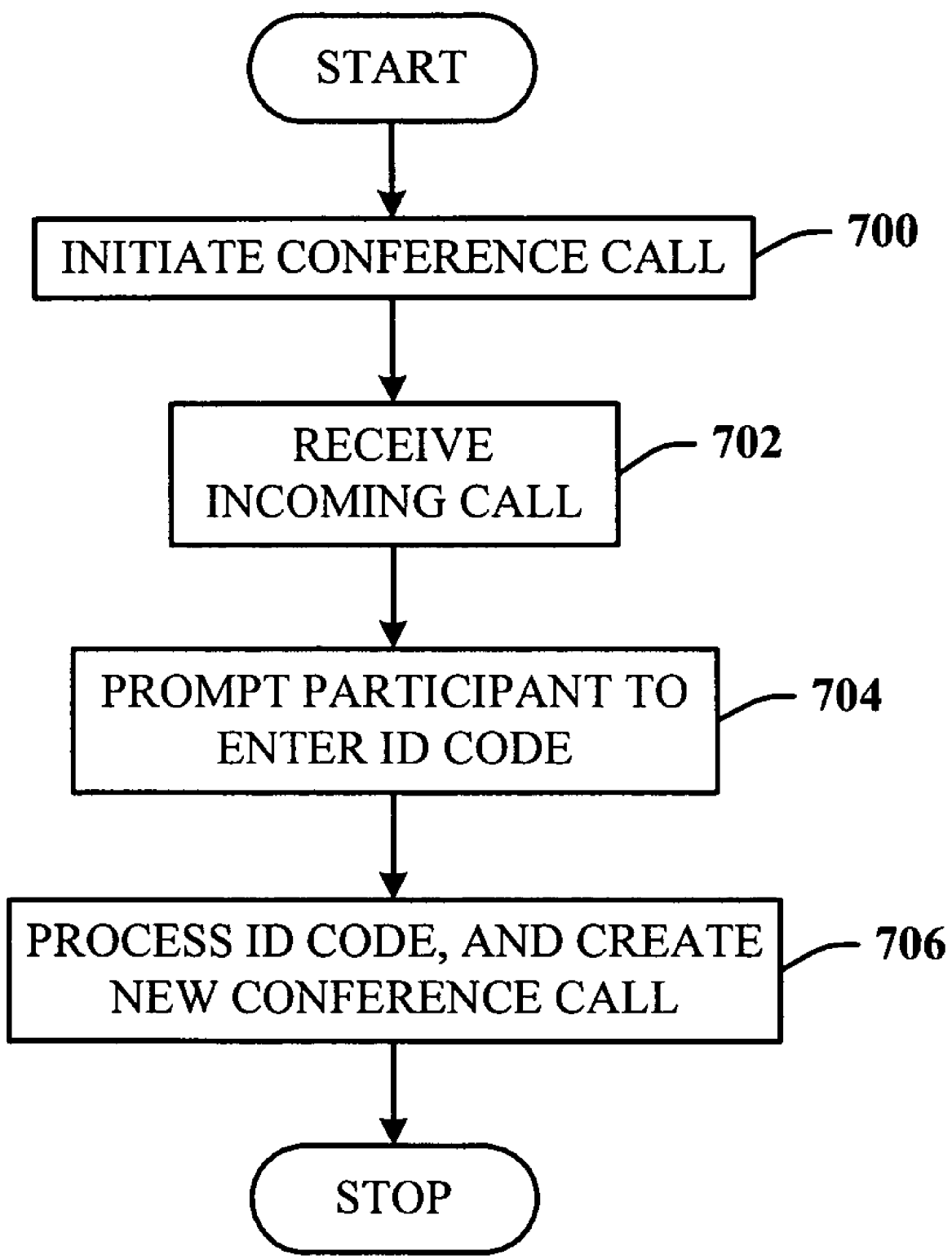
FIG. 7 illustrates a methodology of creating a new conference call in accordance with the invention.

Referring now to FIG. 7, there is illustrated a methodology of creating a new conference call in accordance with the invention. At 700, a conference call is initiated. At 702, an incoming call is received. At 704, the caller is prompted for an ID code. At 706, the ID code is processed, and a new conference call session created.

Figure 8:
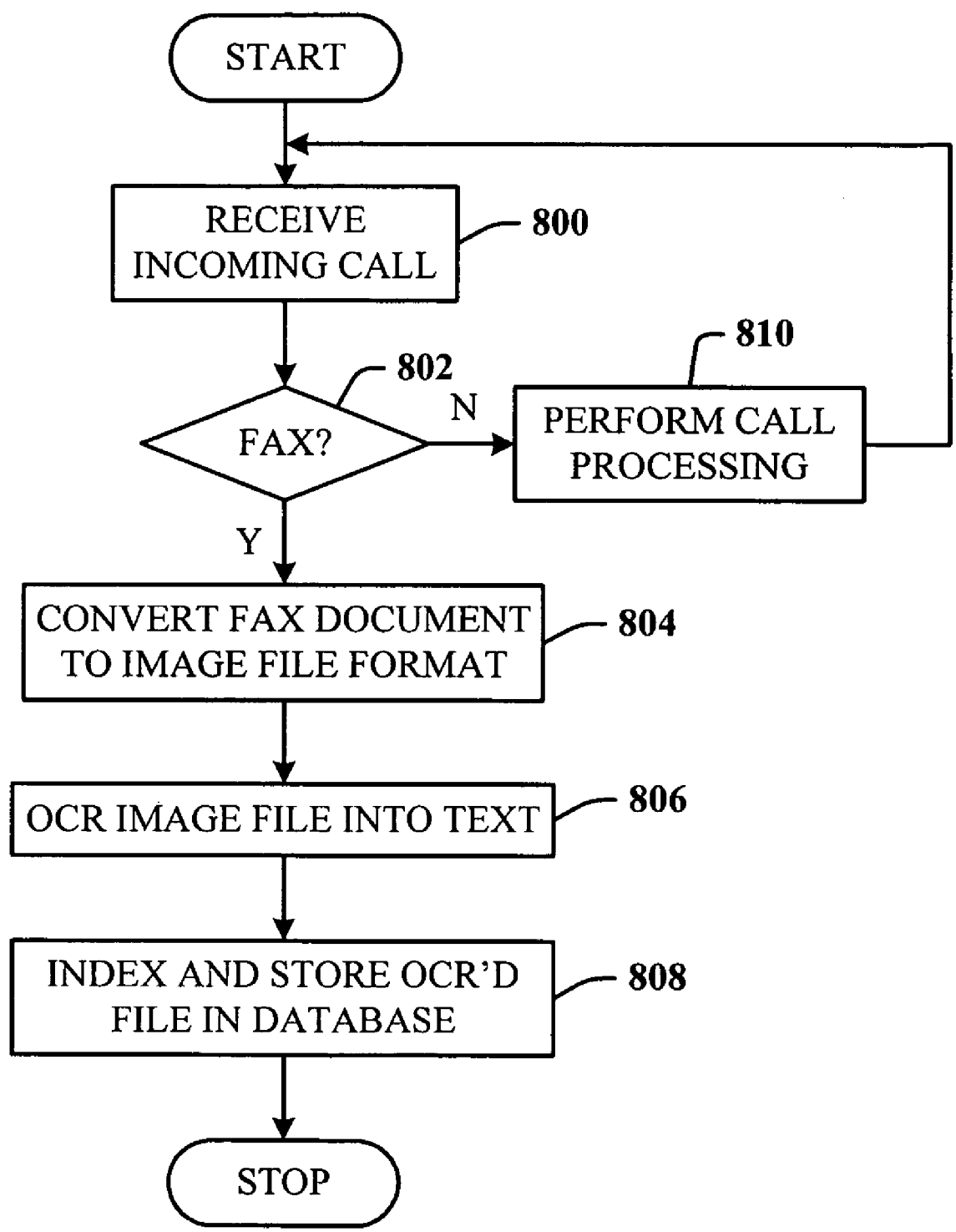
FIG. 8 illustrates a methodology of processing a received facsimile in accordance with the invention.

Referring now to FIG. 8, there is illustrated a methodology of processing a received facsimile in accordance with the invention. At 800, the system receives an incoming call, and analyzes the call signals. At 802, if the incoming call is a fax transmission, flow is to 804 to convert the fax document to an image file format (e.g., a TIFF file) and store the converted document to a hard drive or other storage device. At 806, the image file is processed by optical character recognition (OCR) into plain text data. At 808, the plain text of the fax can be written to a file for indexing and insertion into a database. At 802, if the call is not a fax, flow is to 810 to process the call normally as a voice call.

Figure 9:
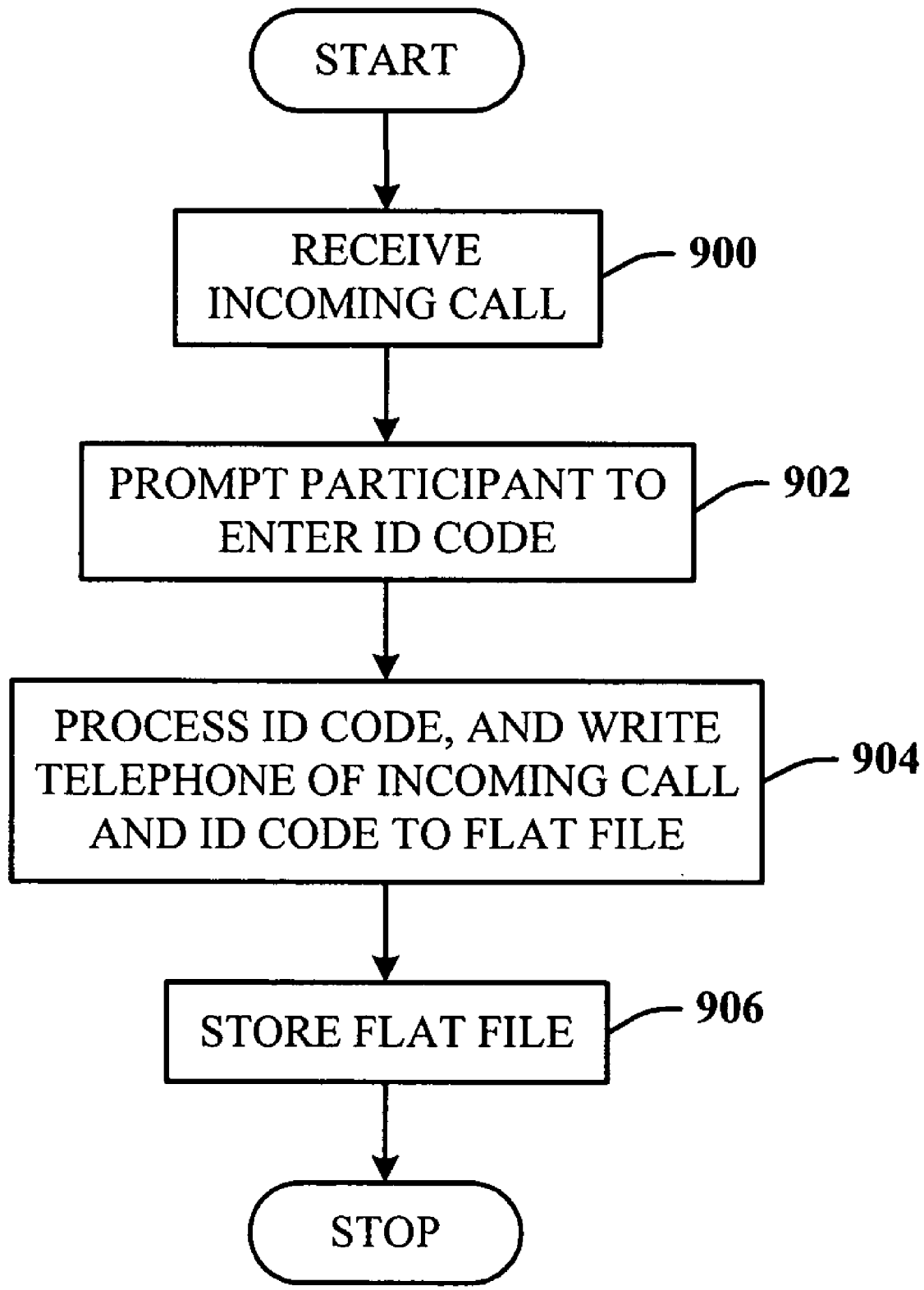
FIG. 9 illustrates a methodology of capturing incoming information in accordance with the invention.

Referring now to FIG. 9, there is illustrated a methodology of capturing incoming information in accordance with the invention. At 900, an incoming call is received. At 902, the caller is prompted to enter an ID code. At 904, the system processes the ID code, and writes the telephone number and ID code of the prospective conference call participant in association therewith to a flat file. At 906, the flat file is then stored for later processing.

Figure 10:
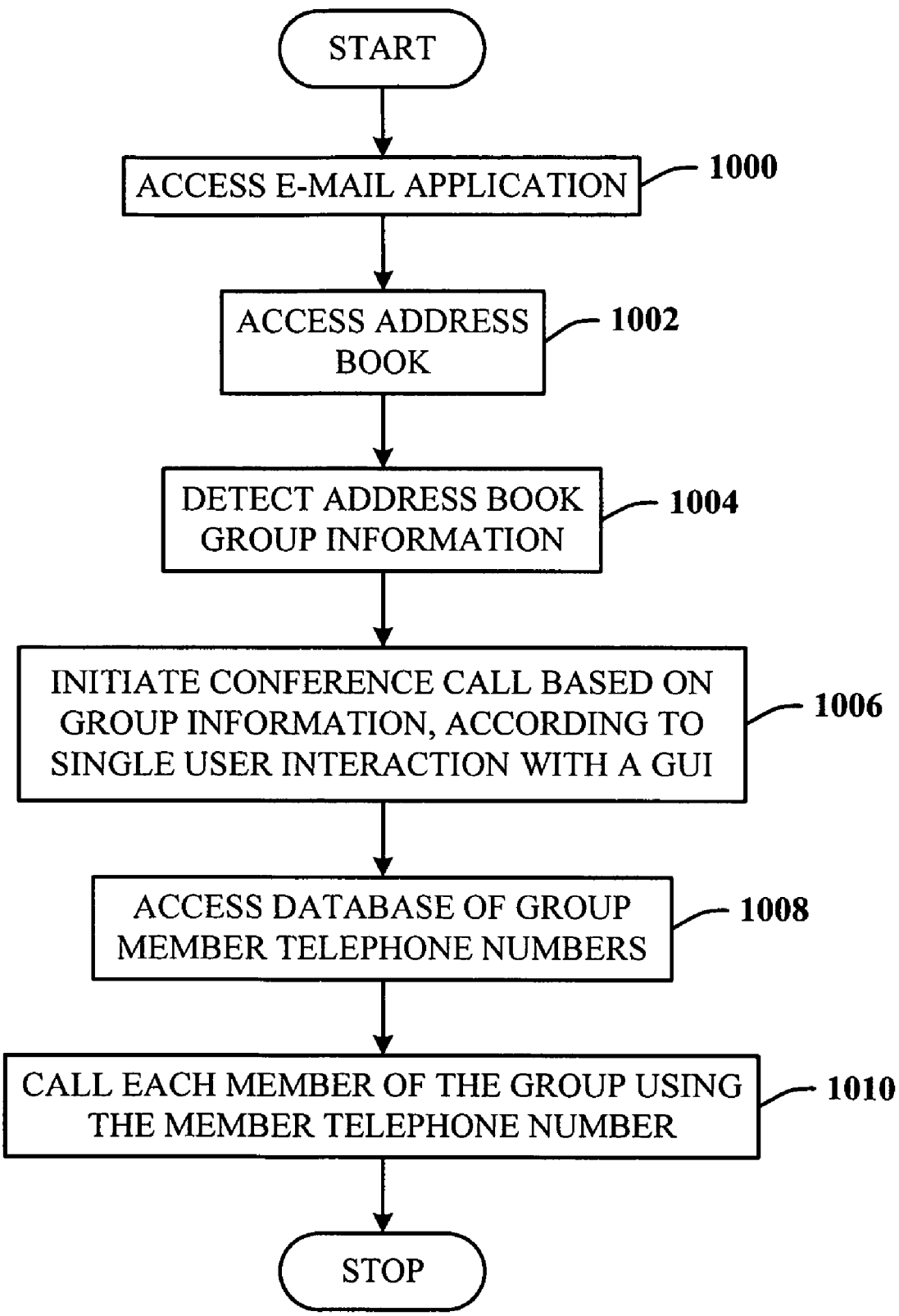
FIG. 10 illustrates a methodology of processing an e-mal address book in accordance with the invention.

Referring now to FIG. 10, there is illustrated a methodology of processing a list of names for a conference call in accordance with the invention. The list of names can be obtained from any data source. For example, in one implementation, a user may establish "groups" from an address book such as that found in Microsoft Outlook™, for example, and the software is capable of allowing the conference manager to invite each member of the group to participate in the conference call via a graphical user interface (GUI) with a single input action (mouse-click). Accordingly, at 1000, a data source (e.g., an e-mail application) is accessed. At 1002, a list of names (e.g., an address book) is accessed therefrom. At 1004, grouping information (e.g., from within the address book) is detected, if available. At 1006, a conference call session is initiated (e.g., based on the grouping information), and according to a single user click and/or interaction with the GUI. At 1008, a database of telephone numbers is accessed from a database. At 1010, each member of the list (e.g., the group) is called using the corresponding member telephone number. As indicated supra, the list of names and any associated grouping information can be obtained from any program and/or data source such as a contacts file stored in an e-mail program, a contacts file stored in a PDA, a cell phone address book, and so on.

Figure 11:
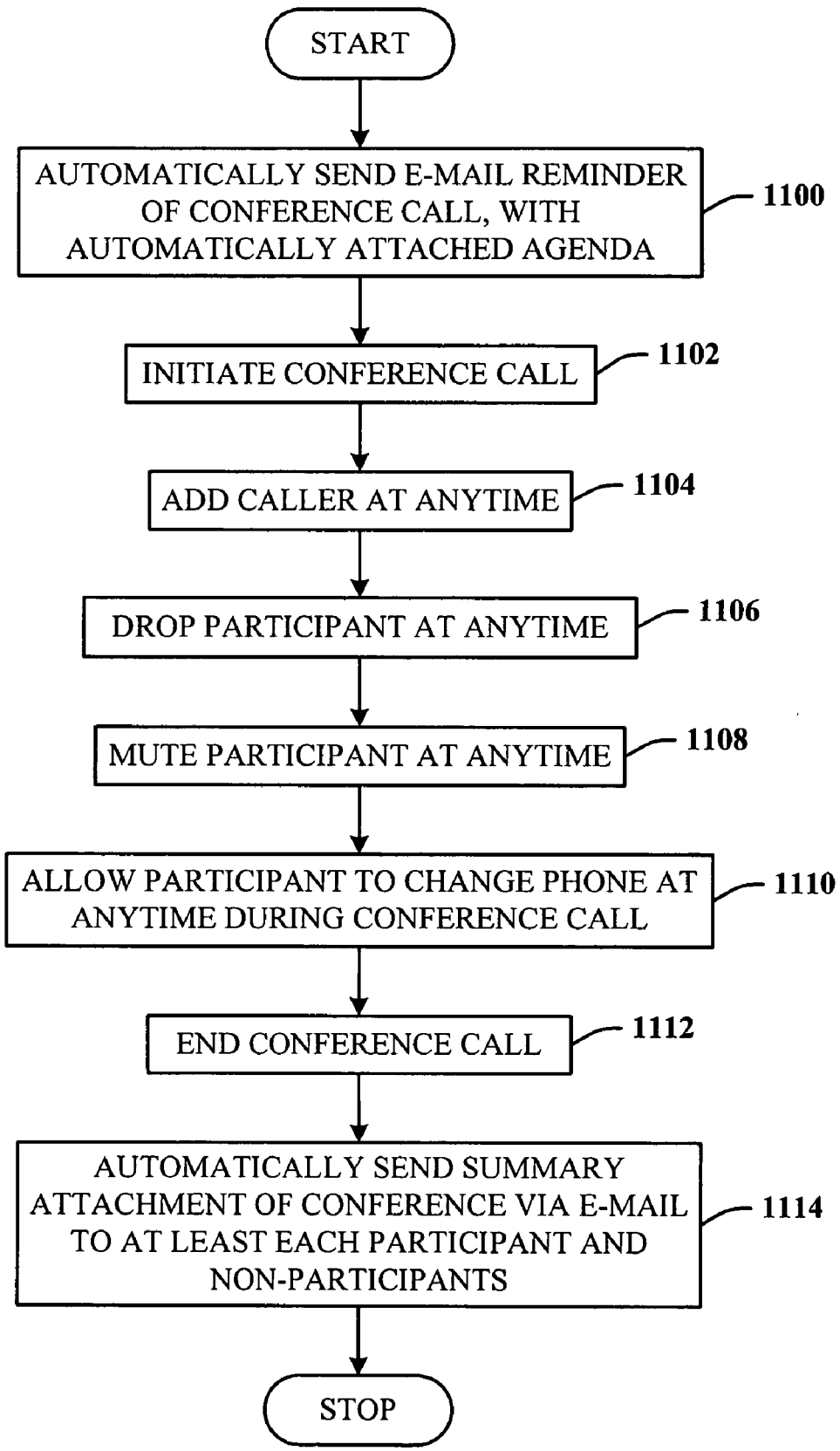
FIG. 11 illustrates a methodology of managing a conference call session in accordance with the invention.

Referring now to FIG. 11, there is illustrated a methodology of managing a conference call session in accordance with the invention. The system of the subject invention permits callers to be added, muted, and/or dropped at any time, and allows callers to change phones in mid-call. The system can call out to participants simultaneously, eliminating the need to wait for everyone to get online, or can let them call in, adding them at any time. The system can send reminders using a variety of mechanisms with the agenda and minutes automatically prior to calls, during calls, and in written summaries of conference call sessions afterwards. In one implementation, the system enables up to fifty-five participants to be bound at one time into a conference call session. However, this is not to be construed as limiting, since additional capacity in terms of hardware and/or software facilitates the addition of a greater number of session participants is within contemplation and scope of the invention.

Accordingly, at 1100, the system can automatically send a reminder to each potential session participant via e-mail or other messaging mechanisms (e.g., SMS-short message service, MMS-multimedia messaging service, . . . ), and with an automatically attached session agenda and file attachments. At 1102, the conference call session is initiated. At 1104, a caller can be added to the session at anytime. At 1106, a session participant can be dropped from the session at anytime. At 1108, a session participant can be muted at anytime. At 1110, a session participant can be allowed to change telephones at anytime during the session. At 1112, the conference call session ends. At 1114, a session summary can be automatically sent to each participant and/or to any non-participant.

Figure 12:
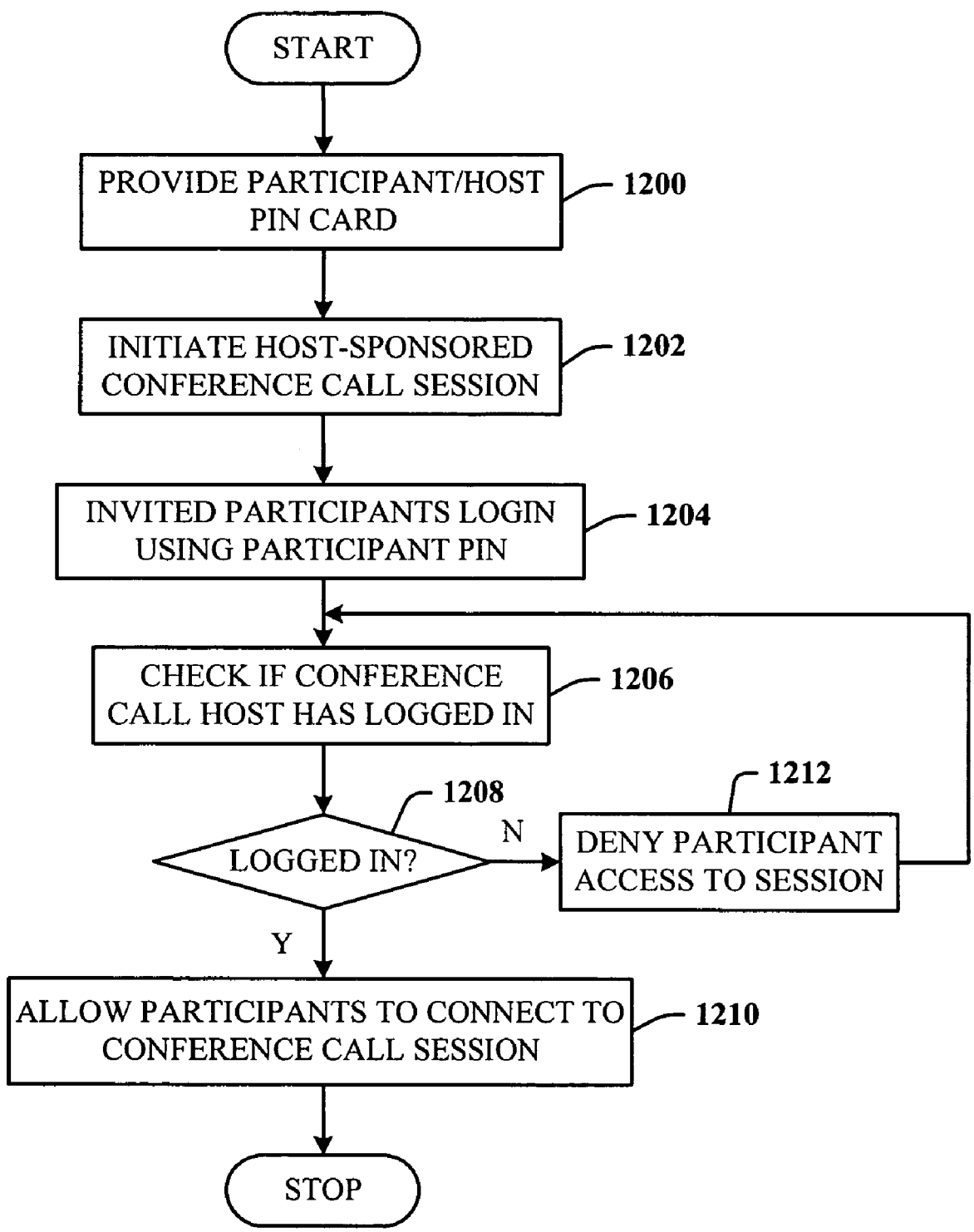
FIG. 12 illustrates a methodology of managing a session by a host in accordance with the invention.

Referring now to FIG. 12, there is illustrated a methodology of managing a session by a host in accordance with the invention. Conference calls may be managed from virtually any computing device and/or telephone, e.g., a touch-tone phone, mobile telephone, personal computer or a wireless PDA (e.g., a Palm™ PDA). More particularly, in keeping with a particularly preferred aspect of the invention, users or participants can dial-in using a Participant Identification Number (PIN), while the host dials in with another PIN (called a host PIN) that can be used to control when the conference starts, for example. In this way, only when the host dials-in will the other callers be connected. This is a particularly effective method for a manager or other supervisor to maintain better control over their conference call session. Additionally, it allows customers the opportunity to issue credit card size conference calling cards containing a permanent host PIN and participant PIN to each person who wishes to make conference calls, without ever even having to use a browser interface.

At 1200, a participant/host card is provided with corresponding PINs for each function. At 1202, the caller initiates a host-sponsored (or hosted) conference call session. At 1204, invited participants log in using the participant PIN. At 1206, the system determines if the host has logged in to start the session. If so, at 1208, flow is to 1210 to allow callers to check in to the session as participants. Alternatively, if the host has not logged in to start the session, no other participants will be allowed to log in, as indicated by 1212. Flow is then back to 1206 to continue checking for the host login.

The browser interface can be used when more console control is desired over the call, such as viewing who is participating in the call and how each participant has been in the session and the how long the session has been in existence. A feature called "Hosted Meet Me" helps prevent potential overuse and misuse of single conferencing PINs. It also prevents the conference call from remaining "open" after the host hangs up. Hosted Meet Me is ideal for large companies that distribute thousands of conferencing PINs to managers, and for university virtual classrooms where the call cannot start until the professor dials in.

Figure 13:
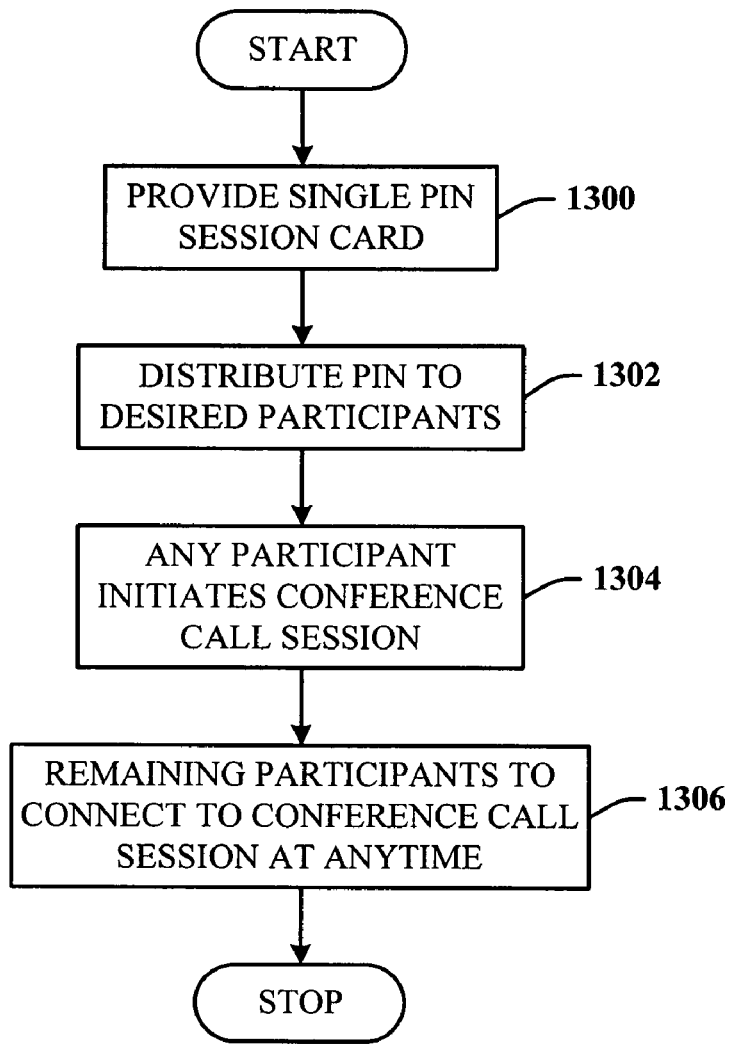
FIG. 13 illustrates a methodology of managing a conference call session in a no-host manner in accordance with the invention.

Referring now to FIG. 13, there is illustrated a methodology of managing a conference call session in a no-host (or non-hosted) manner in accordance with the invention. A single PIN "Meet Me" feature is also provided via the subject invention. This feature issues an active PIN number that can be distributed to any person desired to be in a conference. No Host PIN is created, so whenever any one of these participants calls in, a conference call session can begin with any of the other people who received that PIN. This single PIN Meet Me feature is desirable in many situations where a group of people need equal ability for any of them to start a conference call, such as among an engineering team.

Accordingly, at 1300, a single PIN session number is provided, in the form of, for example, a card. At 1302, the PIN is distributed to potential conference participants. It is to be appreciated that the PIN can be provided by many other conventional means, for example, e-mail, telephone call, messaging to a messaging device, and so on. At 1304, any person who has the PIN can dial-in to start the conference call session. At 1306, the remaining participants can call to connect to the session at any time.

Figure 14:
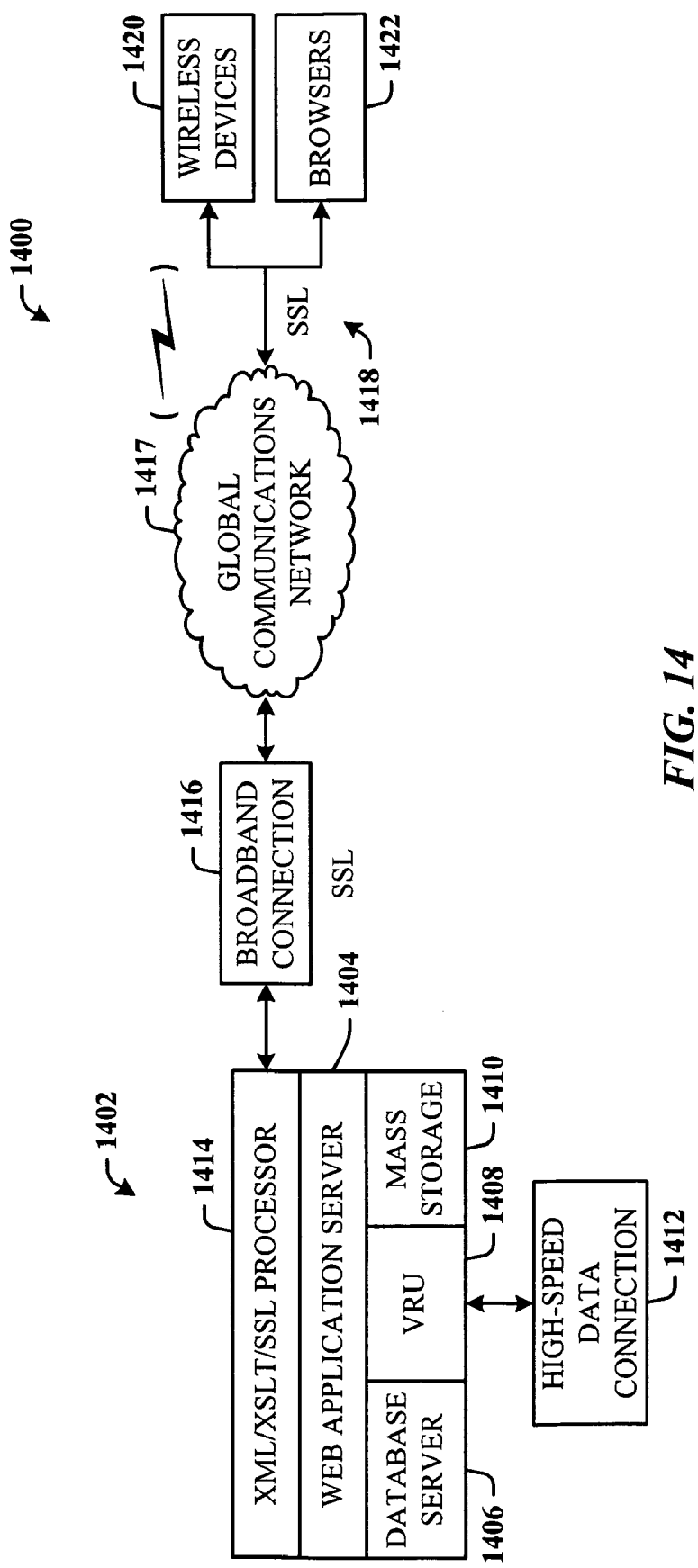
FIG. 14 illustrates a general system configuration of the present invention.

Referring now to FIG. 14, there is illustrated a general system configuration 1400 of the invention. The system 1400 includes a platform 1402 that hosts at least the data management tool, here called a web application server 1404. The server 1404 provides a common layer to underlying services that include a database server 1406, a VRU (voice response unit) 1408 (also called an interactive VRU or IVRU, and similar to the system 100 of FIG. 1 and system 300 of FIG. 3) and mass storage system 1410. The VRU 1408 facilitates interactive calling features for a user via remote touchtone signals and/or speech recognition facilities and to voice data to the caller such that the caller can make choices in response to predetermined options presented by the system.

The platform 1402 can utilize at least one multi-channel data communication connection 1412 (e.g., T1, DS3) into the VRU subsystem 1408 for communicating voice information and interacting with features of the platform 1402. As indicated previously, the invention can accommodate user communication from virtually any accessible network node. To facilitate such an interface, the platform 1402 can include a processor 1414 suitable for XML (eXtensible Markup Language), XSLT (XML Stylesheet Language: Transformations), and SSL processing. The processor 1414 can also access web-based services utilizing SOAP (Simple Object Access Protocol). SOAP employs XML syntax to send text commands across the network using HTTP (HyperText Transport Protocol). Thus, there is a high-speed connection 1416 (e.g., broadband) that interfaces to the processor layer 1414 for use with multiple communication exchanges with remote users disposed on a global communication network 1417. The remote users can access the platform system 1402 via a SSL or other secure connection 1418 using portable wired/wireless devices 1420, and by way of the associated browsers 1422.

The VRU subsystem 1408 also facilitates the recording of voice messages (e.g., voice mail) for access and retrieval at a later time. Additionally, the message is not restricted to access by a single user, but can be accessed by multiples users who are given the access authority (e.g., a PIN for a conference call session). The voice messages can be retrieved and presented via any number of different methods. For example, a user can access the voice message via a cell phone, VoIP phone, IP phone, a computer or computing device (e.g., desktop, laptop, tablet PC, PDA, and so on) by connecting to the system and providing sufficient credentials to access the message(s).

Figure 15:
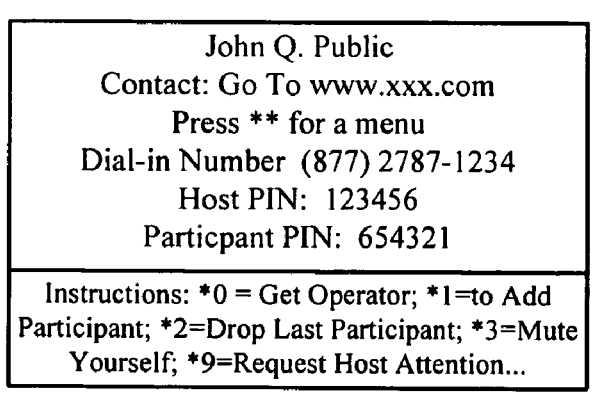
FIG. 15 illustrates a sample PIN card that can be used to access a conference call in accordance with the invention.

FIG. 15 illustrates a sample PIN card 1500 that can be used to access a conference call in accordance with the invention. The card 1500 includes access information in the format of a URL (uniform resource locator) address that can be used to enter into a conference call as a participant (using the participant PIN) or the host (using the host PIN). Other selections allow the caller to connect to an operator, access an options menu, add a participant, increase volume, drop the last participant, record a session, mute yourself, decrease volume, and unmute/request host attention, for example.

Communications between the CTI 112 and the session component 108 of FIG. 1, which together can be considered the VRU 1408 of FIG. 14, can be accomplished using many different programming codes. The code can facilitate a typical dial in process, entering of a PIN number, putting oneself on mute, and adding a participant using a DTMF (dual-tone multi-frequency) response of *1, for example. Both people then hang up.

In one implementation, the SCP (service control point) detects and receives an incoming call, and then sends a message to the VRU. An SCP is an SS7 (Signaling System 7) signaling point with access to a centralized database or enhanced service Intelligent Networking (IN) application. SS7 is an out-of-band signaling system that provides fast call setup (using circuit-switched connections), and transaction capabilities for remote database interactions, such as for example, toll-free number translation databases, a HLR (home location register) and/or VLR (visitor location register) databases in wireless networks. The SCP handles all signaling, while all audio is handled by the VRU. In the case of an SS7 SCP, both the conference sentinel (*1) and the PIN (a number string) are detected by the switch and sent to the SCP as a "dialed digit string." The SCP will make a data query to validate the PIN. Once the PIN has been validated, the SCP accepts the connection and turns control of the call over to the VRU. A conference call session is created, a voice file can be played, and a participant added to the conference call session.

Alternatively, within the scope of the design is a configuration whereby no SCP is provided and all circuits terminate at the VRU. In this case, the call is connected and the user is requested to enter their PIN using the DTMF keys or alternatively, through the mechanism of the ASR. The PIN is then interpreted and validated by the VRU. Subsequent processing of the call and conference is the same for both cases of SCP/VRU as the primary end point. DSP resources are also managed to allocate ports for the calls. The conference call session can be configured by the session host. A session participant can be called in preparation for entry into the conference call session, then a caller can be added to the conference call session, a session participant removed from the current conference call session, and the conference call session terminated. In another implementation, the VRU does not send messaging via an SCP unit, but utilizes other means.

Radio/Telephony Interoperability Architecture

Figure 16:
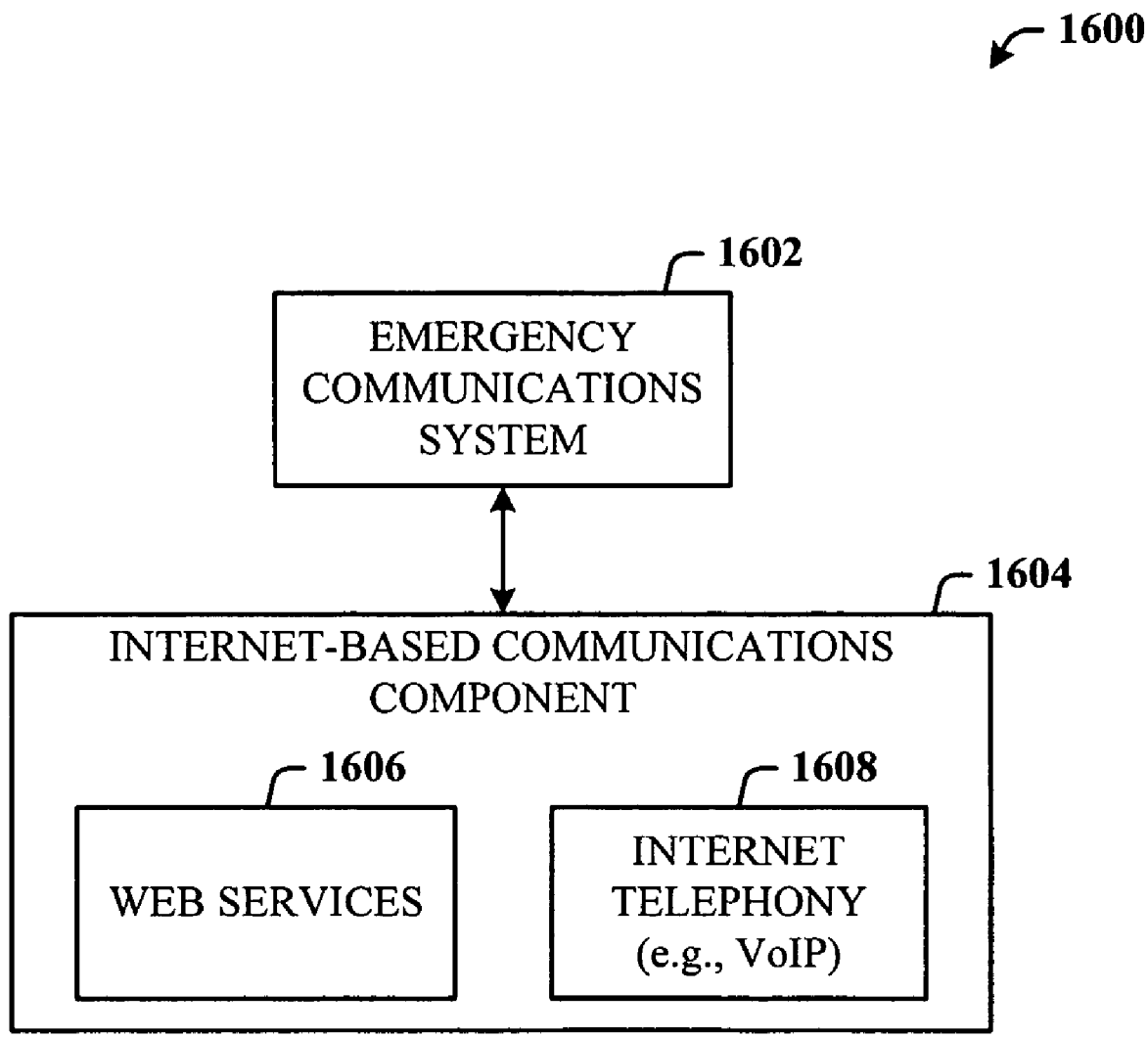
FIG. 16 illustrates a radio/telephony interoperability architecture in accordance with the subject invention.

Referring now to FIG. 16, there is illustrated a radio/telephony interoperability architecture 1600 in accordance with the subject invention. The architecture 1600 facilitates interoperability communications of first responders (and responder radios such as push-to-talk radios), for example, with circuit-switched and/or packet-switched communications entities through the utilization of reliable wireless and/or wired communications that enable real-time information sharing, constant availability, and interagency interoperability during emergency and/or security situations. Additionally, the architecture 1600 provides greater situational awareness that enables emergency first responders to know each other's position in relation to the incident, terrain, neighborhood, or perimeter being secured, for example. The architecture 1600 facilitates the communication of live video and/or voice communication, sensing, and location data for mission-critical information, for example, when catastrophic emergencies and/or security needs arise, and affords a effective communications between fire, police, and emergency services on a horizontal level and jurisdictional communications on a vertical level between local, state, and/or federal entities.

The architecture 1600 includes an emergency/security communications system 1602 that provides communications for related entities (e.g., fire, police, medical, and governmental agencies). The architecture 1600 also includes an Internet-based communications component 1604 that can be disposed on an IP network. The Internet-based communications component 1604 interfaces to the emergency/security communications system 1602 to facilitate at least cellular and/or IP communications to and from the emergency/security communications system 1602. Note that although the component 1604 is referred to as Internet-based, it is to be understood that the component 1604 can be disposed on any IP network (e.g., a LAN). As depicted, the Internet-based communications component 1604 can also include and/or facilitate access to Web-based services and/or Internet telephony (e.g., VoIP). Accordingly, the Internet-based communications component 1604 is shown as including a Web-based service component 1606 and an Internet telephony component 1608. It is to be appreciated that either or both of the components (1606 or/and 1608) can be external to the Internet-based communications component 1604.

Figure 17:
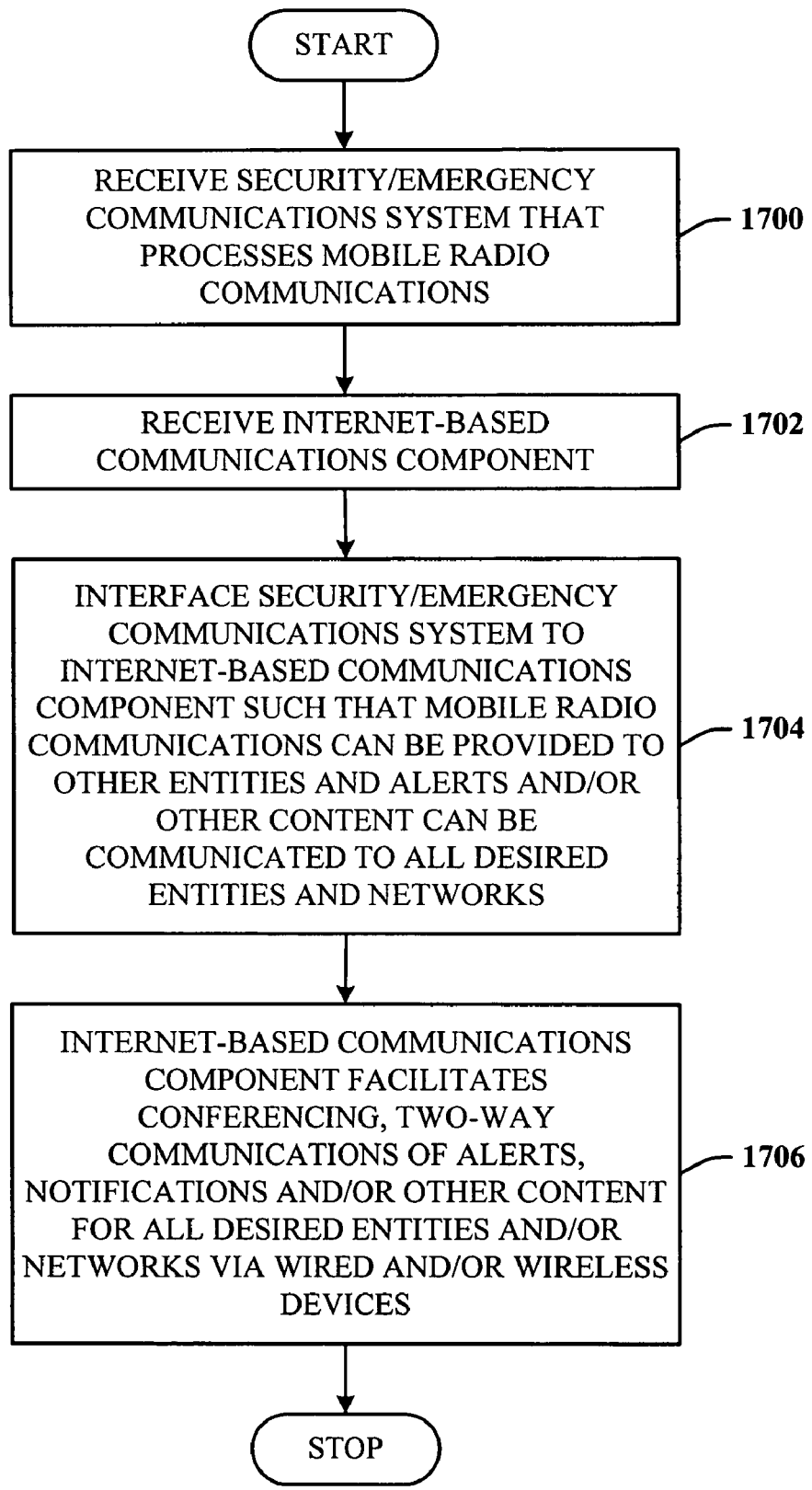
FIG. 17 illustrates a methodology of providing radio/telephony interoperability for security/emergency services in accordance with the invention.

FIG. 17 illustrates a methodology of providing radio/telephony interoperability for security/emergency services in accordance with the invention. At 1700, a security/emergency services system is provided that processes mobile radio communications. At 1702, an Internet-based communications component is provided that can at least create conference call sessions of two or more participants. At 1704, the security/emergency communications system is interfaced to the Internet-based communications component such that mobile radio communications can be provided to other entities (e.g., via a conference call) and, alerts, notifications, and/or other content, for example, can be communicated to all desired entities and/or networks. At 1706, the Internet-based communications component facilitates conferencing, one and/or two-way communications of the alerts, notifications, and/or other content for all desired entities and/or networks via wired and/or wireless communications devices (e.g., cellular telephones, PDAs, IM messaging devices, etc.). It is to be understood that a single user can access the conferencing system and leave messages that can be later accessed and played back, for example.

Figure 18:
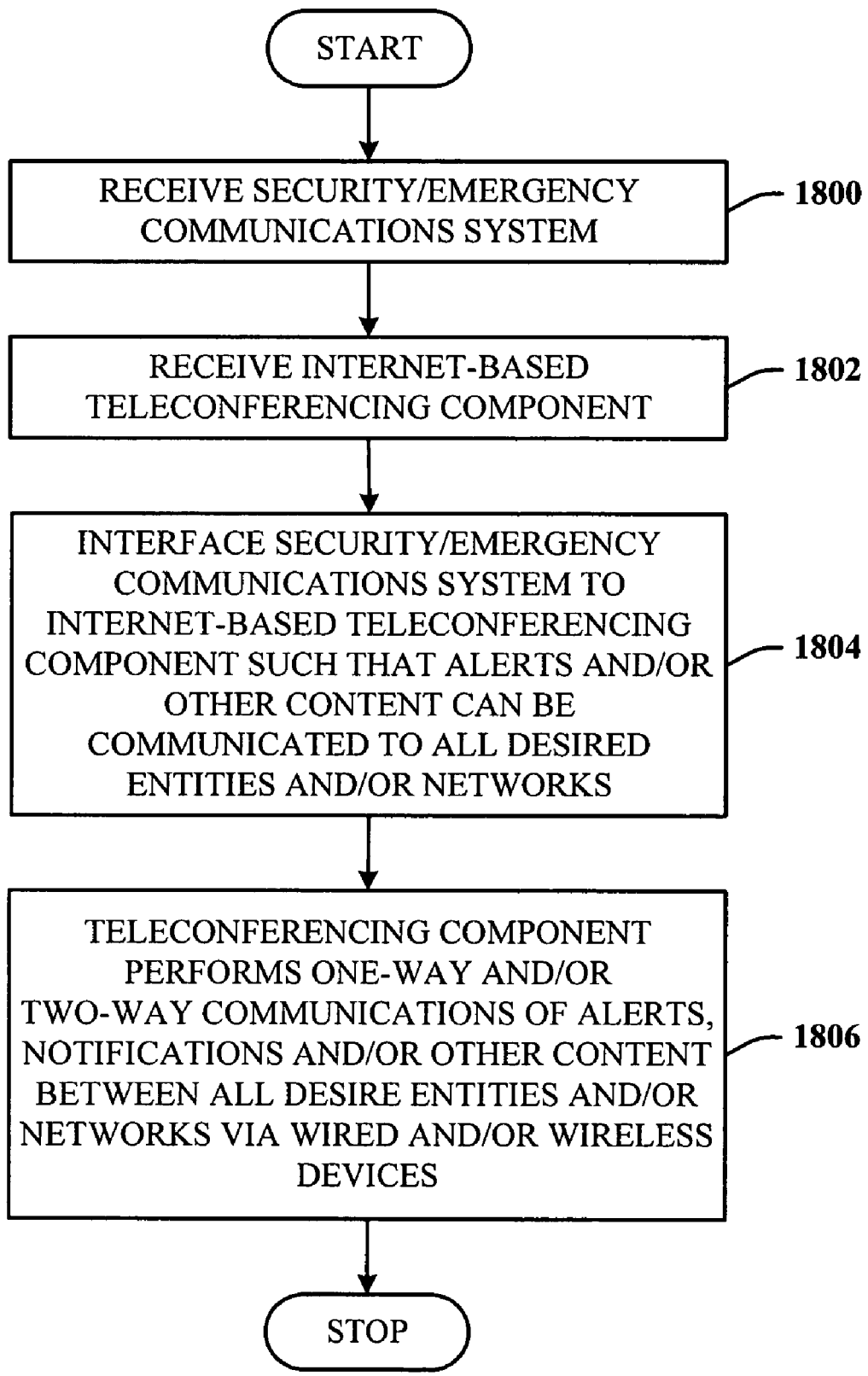
FIG. 18 illustrates a methodology of providing radio/telephony interoperability in accordance with the invention.

FIG. 18 illustrates a methodology of providing radio/telephony interoperability in accordance with the invention. At 1800, an emergency/security services communications network and related systems is received for interfacing. At 1802, an Internet-based teleconferencing component is received. At 1804, the teleconferencing component is interfaced to the emergency/security system, such that alerts and/or other content can be communicated to and/or from the emergency/security services network to all desired entities, device, and/or networks. At 1806, the teleconferencing component communicates one and/or two-way teleconferencing of alerts, notifications, and/or other content between wired and/or wireless voice-capable and/or text messaging devices (e.g., cellular telephones, PDAs, IM messaging devices, etc.), entities and/or networks.

Figure 19:
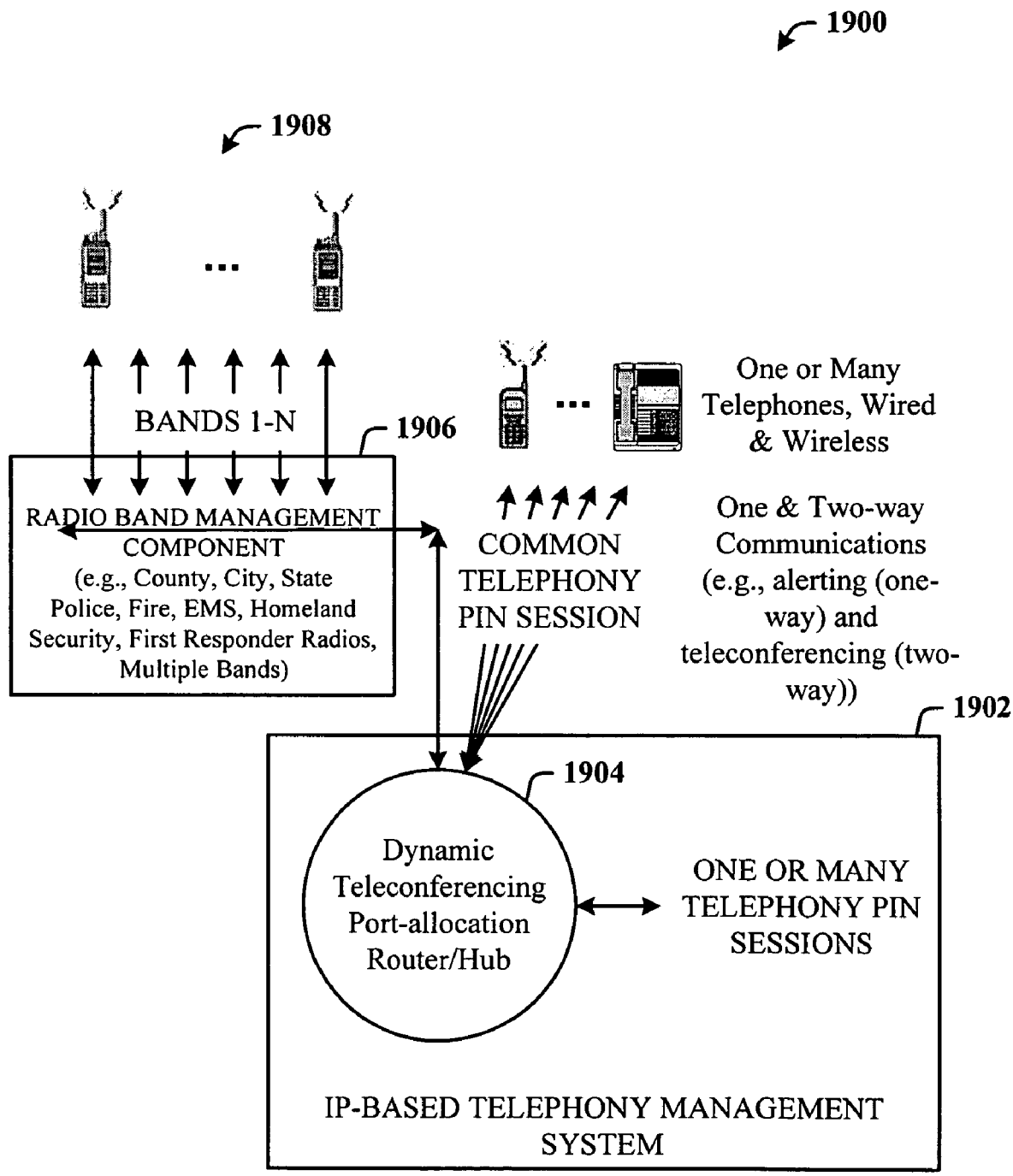
FIG. 19 illustrates a more detailed diagram of a radio/telephony interoperability system in accordance with the subject invention.

FIG. 19 illustrates a more detailed diagram of a radio/telephony interoperability system 1900 in accordance with the subject invention. The system 1900 can include an IP-based (e.g., the Internet) telephony management system 1902 that is disposed on an IP network (e.g., the Internet) thereby providing access for at least any authorized IP entity (e.g., user, network node, gateway, bridge, . . . ). The telephony management system 1902 can further include a dynamic port-allocation router/hub system 1904 described in greater detail supra. The telephony management system 1902 interfaces to a radio band management component 1906 which can include a single radio band component or any combination of radio band components associated with security and/or emergency service entities. For example, the radio band components can be associated with radio frequencies utilized by police departments, fire departments, emergency medical support systems, weather systems, county, city, state and federal security/emergency agencies, first responder radios, and so on. Accordingly, the radio band management component 1906, if a combination of many different radio band components, can accommodate many different radio frequencies (denoted BANDS 1-N, where N is an integer).

The interoperability between the radio band management component 1906 and the telephony management component 1902 facilitates single or multiple conference-type sessions to be operable and any given time. In one implementation, all that is required is a unique PIN (personal identification number) that a user needs to initiate a session or access an ongoing session. A user can initiate or access a multi-user session using wired and/or wireless communications devices. For example, where the emergency entity (e.g., police) are engaged in an ongoing situation using push-to-talk radios 1908, a user of a cell phone, given proper access, can dial-in to an ongoing session that was initiated via the telephony management system 1902. The user can be restricted to listen-only access (e.g., one-way communications) and/or listen/speak access (two-way communications). This can be initiated based on the type of PIN code provided.

In another example, alerting can be provided via a one-way communication (e.g., listen-only) and full teleconferencing by way of two-way communications (e.g., for a first responder participant). As indicated supra, the telephony management system 1902 is capable of processing multiple simultaneous one or many PIN, single or multiple user, sessions. That is, a first session can require that each participant utilize a different PIN when entering a single session. This provides control over who is a listen-only participant and who is a full participant (e.g., speak and listen). A second session, ongoing at the same time, can require that all participants use the same PIN to enter the second session. Accordingly, it can be appreciated that the telephony management system 1902 provides substantial flexibility and control over sessions (single user and multi-user).

The first session can be police first responders communicating in a first session, and the soon-to-arrive EMS (emergency medical services) personnel communicating in a second session. Although the sessions initially can be operational as separate sessions, depending on the changing circumstances of the situation, the sessions can be automatically combined, thereby providing merged access for all participants based on the pre-existing session rights. Thus, a listen-only participant of the first session is only granted listen-only rights when the sessions are merged.

For all sessions, the notion of presence of the participants can be recorded and rendered usable by participants and hosts alike.

Figure 20:
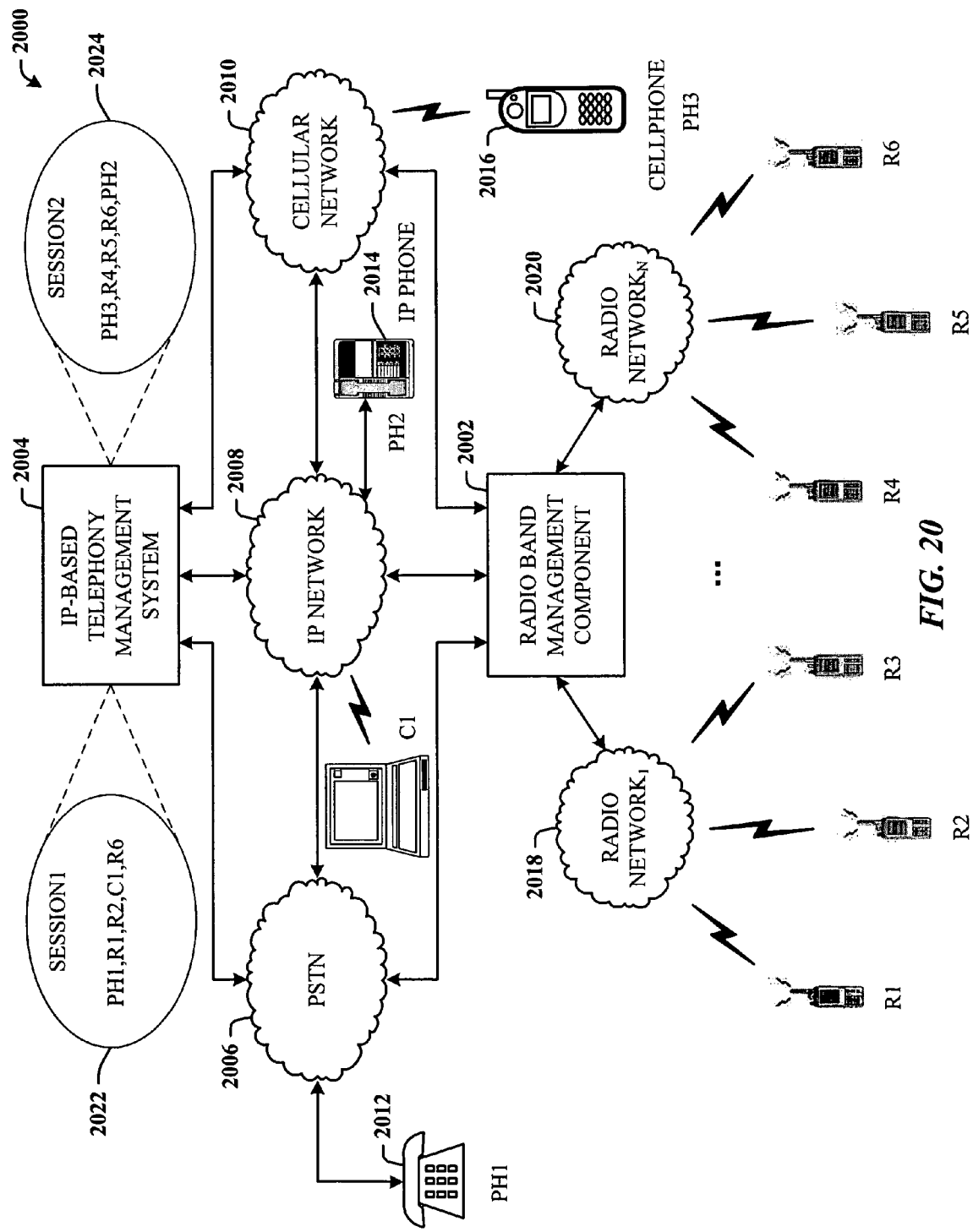
FIG. 20 illustrates an infrastructure framework for interfacing a radio management component and an IP-based telephony management system.

FIG. 20 illustrates an infrastructure framework 2000 for interfacing a radio management component 2002 and an IP-based telephony management system 2004. The framework 2000 can include the PSTN 2006 for allowing access to circuit-switched access, an IP network 2008 (e.g., the Internet) for allowing wired and/or wireless IP-based access, and/or a cellular network 2010 for wireless access. The telephony management system 2004 can interface to the radio management component 2002 via any one or more of these networks (2006, 2008, and/or 2010). Additionally, phone user(s) (e.g., 2012, 2014, and/or 2016) on any of these respective networks (2006, 2008, and/or 2010) can gain access to the telephony management system 2004, upon providing proper authorization credentials, which access will allow one-way and/or two-way communications with users communicating via the radio management component 2002.

The radio management component 2002 can manage multiple radio networks each having the same or different frequency bands (denoted RADIO NETWORK$_1$, . . . , RADIO NETWORK$_N$, where N is an integer). Thus, a first radio network 2018 can be associated with radio traffic of a first responder police unit and a second radio network 2020 can be associated with radio traffic a first responder fire unit, for example. As indicated supra, the telephony management system 2004 can facilitate the merger of separate conferencing sessions currently underway by the first radio network 2018 and the second radio network 2020. Additionally, other management controls and restrictions can be applied for the merger.

The previously applied merger can also be automatically "un-merged" or segregated, as desired. For example, as the number of personnel assigned to the situation begins to respond or enter a conference session, the amount of chatter or traffic may become confusing, counterproductive and inefficient such that segregation of the sessions is more desirable. Accordingly, those session participants who entered the session under a first PIN can automatically be reassigned to another session associated with the first radio network, and the session participants who entered the session under a second PIN can automatically remain in the current session, or be reassigned to a new session that is associated with the second radio network. As can be understood, the capability to manage sessions and session participants in accordance with the subject telephony management system can provide significant advantages and improvements over conventional architectures.

Depicted are two sessions, a first session 2022 and a second session 2024, which are being managed by the telephony management system 2004. The first session 2022 includes the following participants: a caller of phone 2022 (denoted PH1), a first radio operator (R1) of the first radio network 2018, a second radio operator (R2) of the first radio network 2018, a computer user (C1) in wireless communications with the IP network 2008, and a sixth radio operator (R6) of the second radio network 2020. The second session 2024 includes the following participants: a caller of cell phone 2016 (denoted PH3), a fourth radio operator (R4) of the second radio network 2020, a fifth radio operator (R5) of the second radio network 2020, the sixth radio operator (R6) of the second radio network 2020, and a caller using the IP phone 2014 (denoted PH2). Note that a radio operator can be a participant in more than one session, simultaneously (see R6), various types of telephones (e.g., 2012, 2014, and/or 2016) and other computing devices (e.g., computer C1) can access the system 2004 and sessions (e.g., 2022 and/or 2024), and over various types of networks (e.g., 2006, 200, and/or 2010). Session participants can drop in and out of sessions at any time, be moved from one session to another at any time, be restricted or limited in the type of session access, communicate with selected radio networks and radio operators, access recorded messages, leave recorded messages, and so on.

The presence of attendees and the status of their participation in any specific session are maintained by the presence service that is an element in the framework. The presence status may also be used by an authorized user to request how and where a particular person, who is not a current participant, may be contacted.

Figure 21:
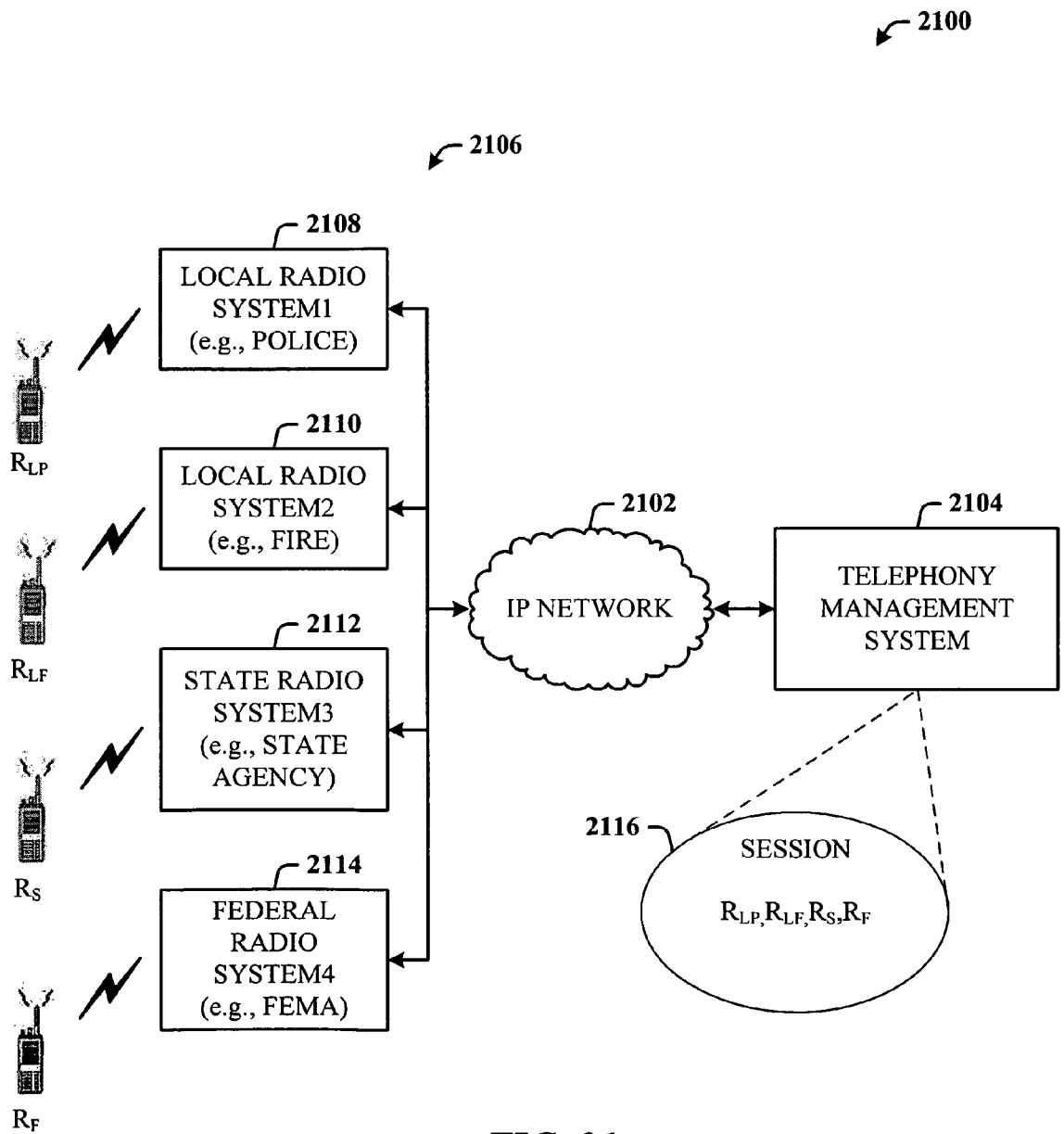
FIG. 21 illustrates a radio/telephony interoperability communications system that facilitates horizontal/vertical communications in accordance with an innovative aspect.

FIG. 21 illustrates a radio/telephony interoperability communications system 2100 that facilitates horizontal/vertical communications in accordance with an innovative aspect. The system 2100 includes an IP network 2102 (e.g., the Internet) that interconnects a telephony management system 2104 with at least four radio systems 2106 which can be utilized at various levels and by various entities. For example, a first radio system 2108 supports a local police department, a second radio system 2110 supports a local fire department, a third radio system 2112 supports a state agency (e.g., state police), and a fourth radio system 2114 supports a federal agency (e.g., FEMA-federal emergence management agency). The telephony management system 2104 can create a session 2116 in which a radio operator (R$_{LP}$) from the local police, radio operator (R$_{LF}$) from the local fire department, radio operator (R$_S$) from the state agency (e.g., state police)

and a radio operator ($R_F$) from the federal agency (e.g., FEMA) can join to listen in and/or participate in the session at any time.

Figure 22:
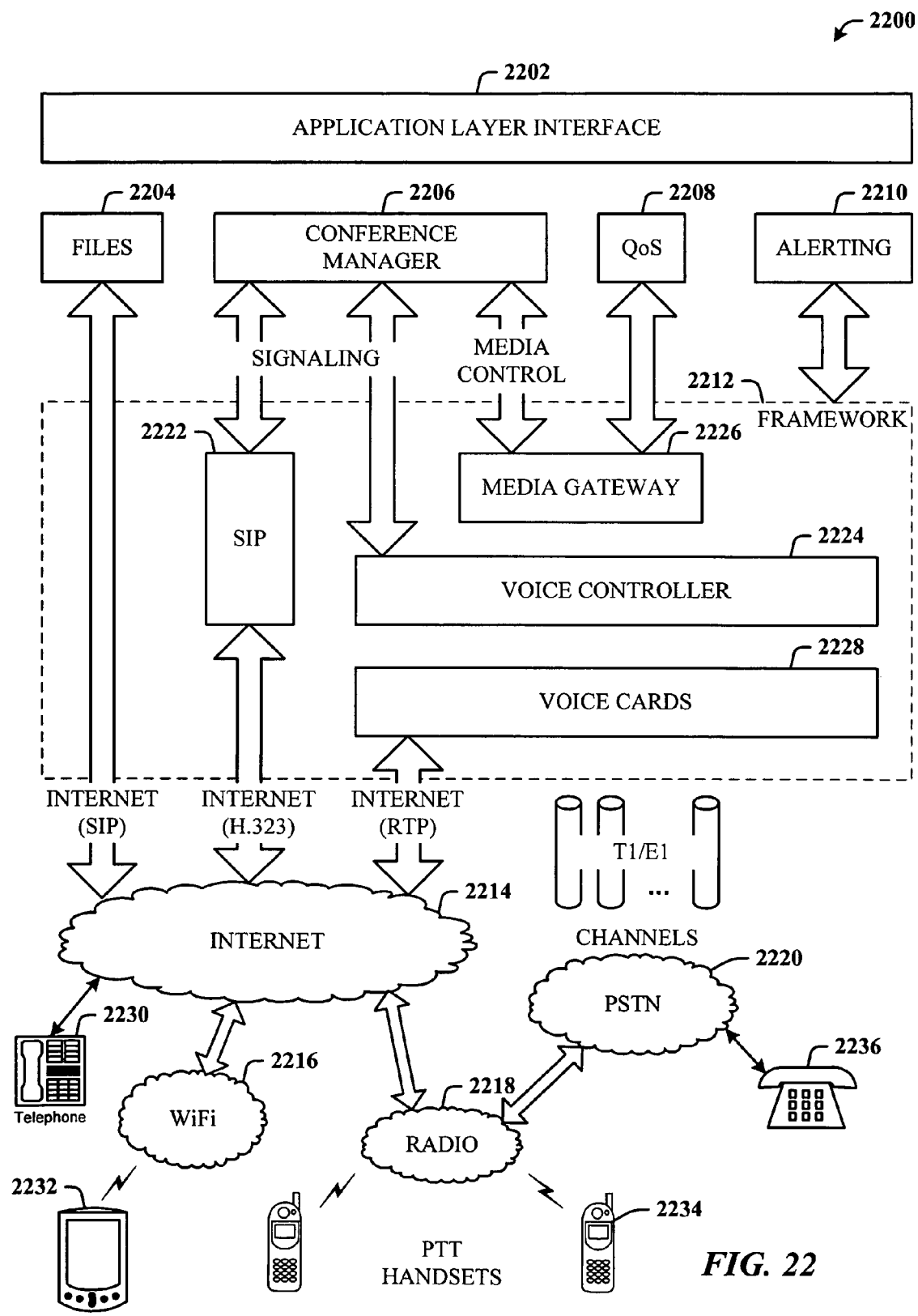
FIG. 22 illustrates a block diagram of an exemplary telephony management communications system in accordance with an innovative aspect.

FIG. 22 illustrates a block diagram of an exemplary telephony management communications system 2200 in accordance with an innovative aspect. The telephony management system 2200 can be employed as a telephony conferencing manager for call conferencing, as desired. The system 2200 can include an application layer interface 2202 that provides exposure to overlying applications and underlying files 2204, a conference manager 2206, a quality-of-service (QoS) component 2208, and an alerting component 2210.

The system 2200 can include a communications framework 2212 via which the files 2204, conference manager 2206, (QoS) component 2208, and an alerting component 2210 can interface to external networks (e.g., the Internet 2214, a Wi-Fi network 2216, a radio network 2218, and/or a PSTN network 2220). The files 2204 can be communicated directly through the framework 2212 to the Internet using an appropriate data transmission or sharing protocol. The conference manager 2206 can interface to the Internet 2214 and other networks via a SIP (session initiation protocol) component 2222 of the framework 2212, and therefrom via an H.323 protocol to the Internet 2214 or other protocols, to exchange signaling information.

H.323 is an international standard for multimedia communications over packet-switched networks, including LANs, WANs, and the Internet. H.323 is an "umbrella" specification that includes the standards H.323, H.225.0, H.245, the H.450-series documents, and the H.460-series. H.323 allows for the use of T.120 protocols for data collaboration and file transfer. T.120 is data conferencing standard that provides real-time communication between two or more entities in a conference. Applications specified as part of the T.120 family can include application sharing, electronic white boarding, file exchange, and chat. T.120 may be used stand-alone or in conjunction with other protocols, such as H.323 and SIP.

SIP is an IETF (Internet Engineering Task Force) standard for the establishment of multimedia sessions, which can be used for audio, video, messaging (e.g., instant messaging) and/or other real-time data communication sessions. The scope of SIP is relatively broad, including the establishment of virtually any kind of session between two parties.

The scope of H.323 can cover real-time voice (e.g., VoIP), video, and data communications over packet-switched networks. H.323 is designed to operate over IP networks, primarily, though H.323 can also operate over other packet-switched networks. H.323 includes multipoint voice and video conferencing capabilities.

The conference manager 2206 can also interface to internal components of the framework 2212. For example, signaling information can also be communicated to a voice controller component 2224 (e.g., an NMS natural access card by NMS Communications of Framingham, Mass.). Natural Access is a modular runtime and development environment for creating voice, fax, and call processing applications using NMS media processing platforms and can provide a consistent application programming interface (API) for integrating and presenting media and telecommunication capabilities to an application. Standard features include telephony call control, voice record and playback, tone detection and generation, and industry-standard H.100/H.110 switching support.

The conference manager 2206 can also interface to an internal media gateway component 2226 (e.g, fusion—an IP telephony API programming environment by NMS Communications) of the framework 2212. The conference manager 2206 can communicate at least media control information to the media gateway 2226. The QoS component 2208 can also interface to the media gateway 2226 to communicate, measure and determine QoS information. The alerting component 2210 can interface to the framework 2212 for the communication of alerts and notifications, for example.

The communications framework 2212 can also include one or more voice cards 2228 (e.g., a model CG6565 card by NMS Communications, or other similar vendor models having similar capabilities) that facilitate the conversion of voice signals into voice data for transmission to the Internet 2214 via RTP (real-time transport protocol) technology. RTP can be employed to support streaming real-time multimedia over IP in packets (e.g., voice and video over packet-switched networks).

The framework 2212 can also provide other types of packet communications channels such as T1 (1.54 Mbps) and/or E1 (2.048 Mbps) to the PSTN 2220. Thus, the system 2200 can facilitate communications to an IP phone 2230 for VoIP, a PDA 2232 in communications with the Wi-Fi network 2216, push-to-talk devices 2234 (e.g., handheld radios) that communicate via the radio network 2218 (e.g. mesh radio networks for emergency and/or security services), and conventional telephones 2236 that connect to the PSTN system 2220, for example.

Figure 23:
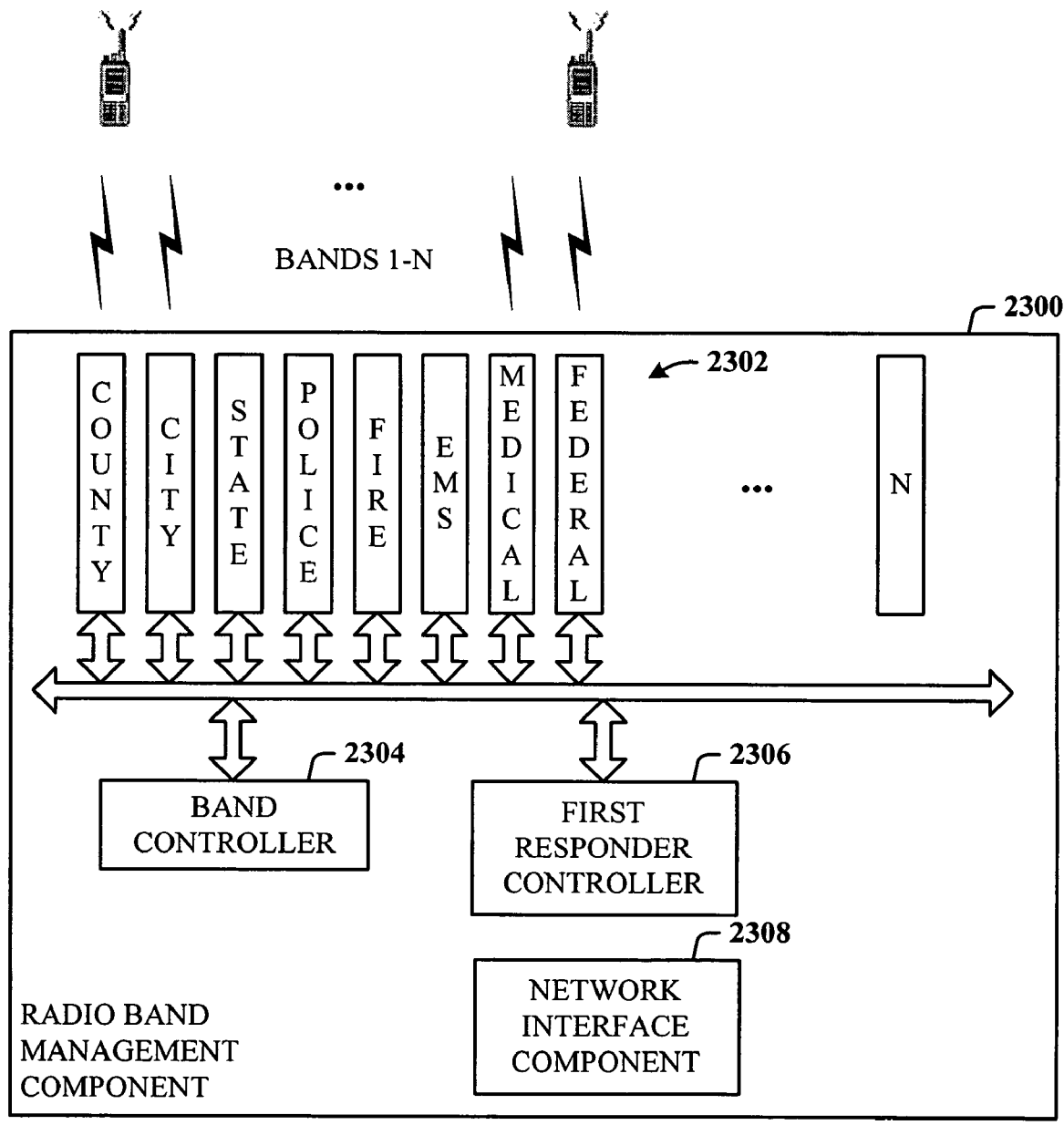
FIG. 23 illustrates an exemplary radio band management component in accordance with an aspect of the invention.

FIG. 23 illustrates an exemplary radio band management component 2300 in accordance with an aspect of the invention. The band management component 2300 is generalized as being operational to accommodate multiple radio frequency bands (denoted BANDS 1-N, where N is an integer) that are typically employed by security and/or emergency services. For example, the band management component 2300 can include one, some, or all of radio subcomponents 2302 that can provide the radio network services for security and/or emergency personnel and operations. For example, the radio subcomponents 2302 can include county, city, state, police, fire, EMS, medical, federal, and any other radio subcomponent desired to N radio subcomponents.

The band management component 2300 can also include a band controller 2304 that facilitates control and/or selection of one or more of the radio subcomponents for intercommunications access. For example, if the telephony management component initiates a conference session for country and medical personnel, this can be communicated to the band controller 2304 to select the county and medical radio subcomponents for binding and interaction into the session.

The band management component 2300 can also include a first responder controller 2306 that facilitates control and/or selection of one or more of the first responder radio subcomponents for intercommunications access. For example, if the telephony management component initiates a conference session for police and EMS personnel, this can be communicated to the first responder controller 2306 to select the police and EMS radio subcomponents for binding and interaction into the session.

The band management component 2300 can also include a network interface component 2308 that facilitates communications over one or more different networks. For example, the interface component 2308 can facilitate communications over the PSTN, Internet, and/or cellular networks (e.g., GSM, UMTS, CDMA . . . ) for access to the telephony management system and/or other access mechanisms (e.g., callers, computer access, and so on).

It is to be understood that many of the band management components 2300 can be networked together (e.g., via an IP network) utilizing the network interface component 2308. For example, a local implementation can include a first band management component for police, a second band management component for EMS, a third band management component for fire, and so on. Accordingly, each band management component can be controlled to select the desired radio subcomponents to bind into a conference session.

Figure 24:
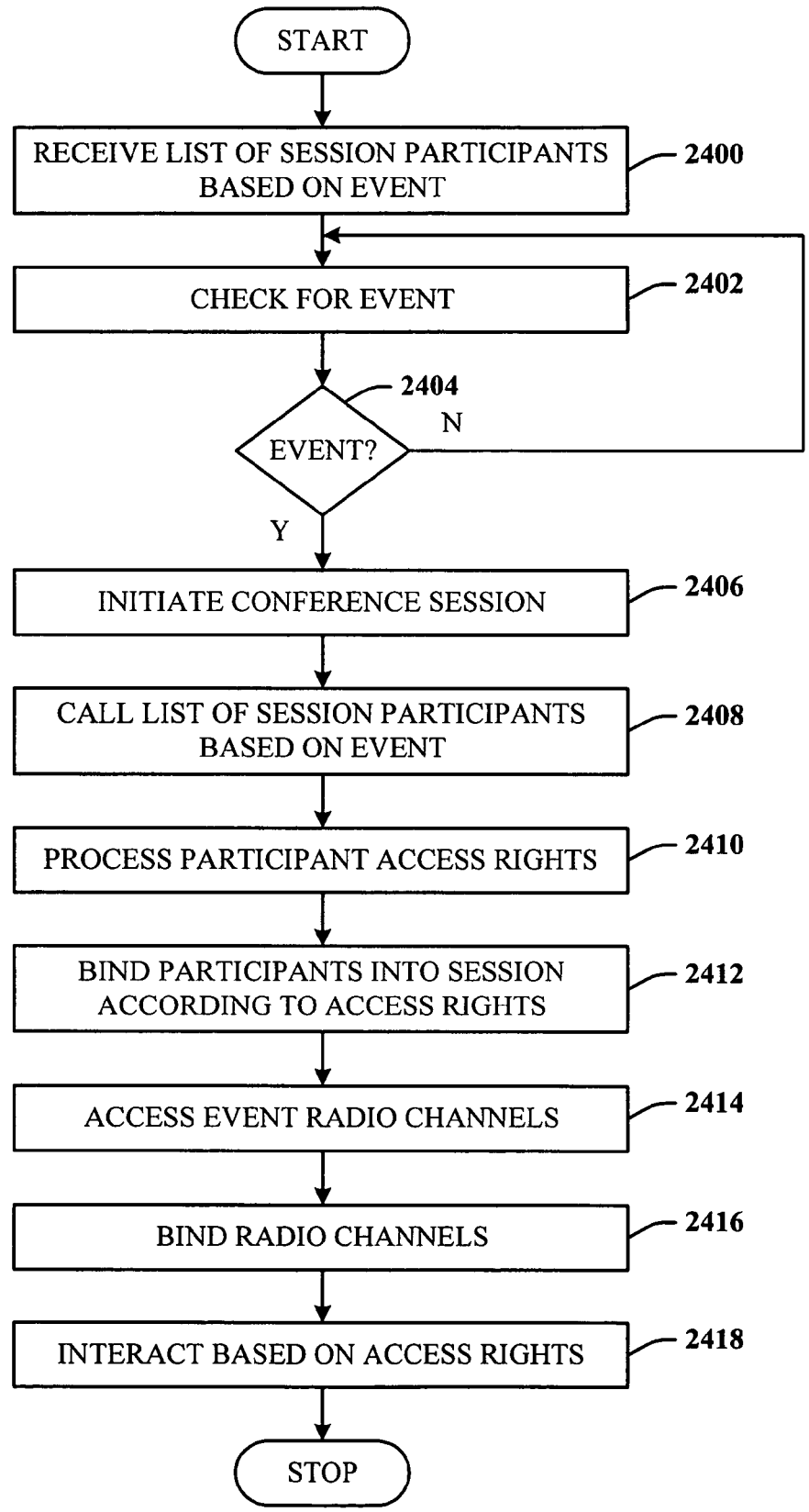
FIG. 24 illustrates a methodology of creating a session and binding participants into a session in accordance with the subject innovation.

FIG. 24 illustrates a methodology of creating a session and binding participants into a session in accordance with the subject innovation. At 2400, a list of session participants is received and stored, based on the occurrence of a predetermined event. For example, in the event that a major fire occurs, the list can include certain members of the fire department, police department, and medical facility. Thus, when an alarm is triggered at the fire department, a representative signal is transmitted to the telephony management system that initiates a conference session, calls the list of personnel, and binds the calls into a conference session during which the event and personnel can be monitored to some extent. Accordingly, at 2402, a check is made for an event or a representative trigger signal. At 2404, if the event has not occurred, flow is back to 2402 to continue checking for a trigger signal or event. At 2404, if the event has occurred, flow is to 2406, initiate a conference session. At 2408, the list of session participants associated with the event, are called. In the event that a participant is not reachable by telephone, alternative mechanisms available to the system are used to send notifications and alarms to the participant. At 2410, participant access rights associated with the session are processed. At 2412, called participants are bound into the conference session according to the session access rights. At 2414, event radio channels are accessed. At 2416, the accessed radio channels are bound into the session. At 2418, participant interaction can now occur based on the session access rights.

Figure 25:
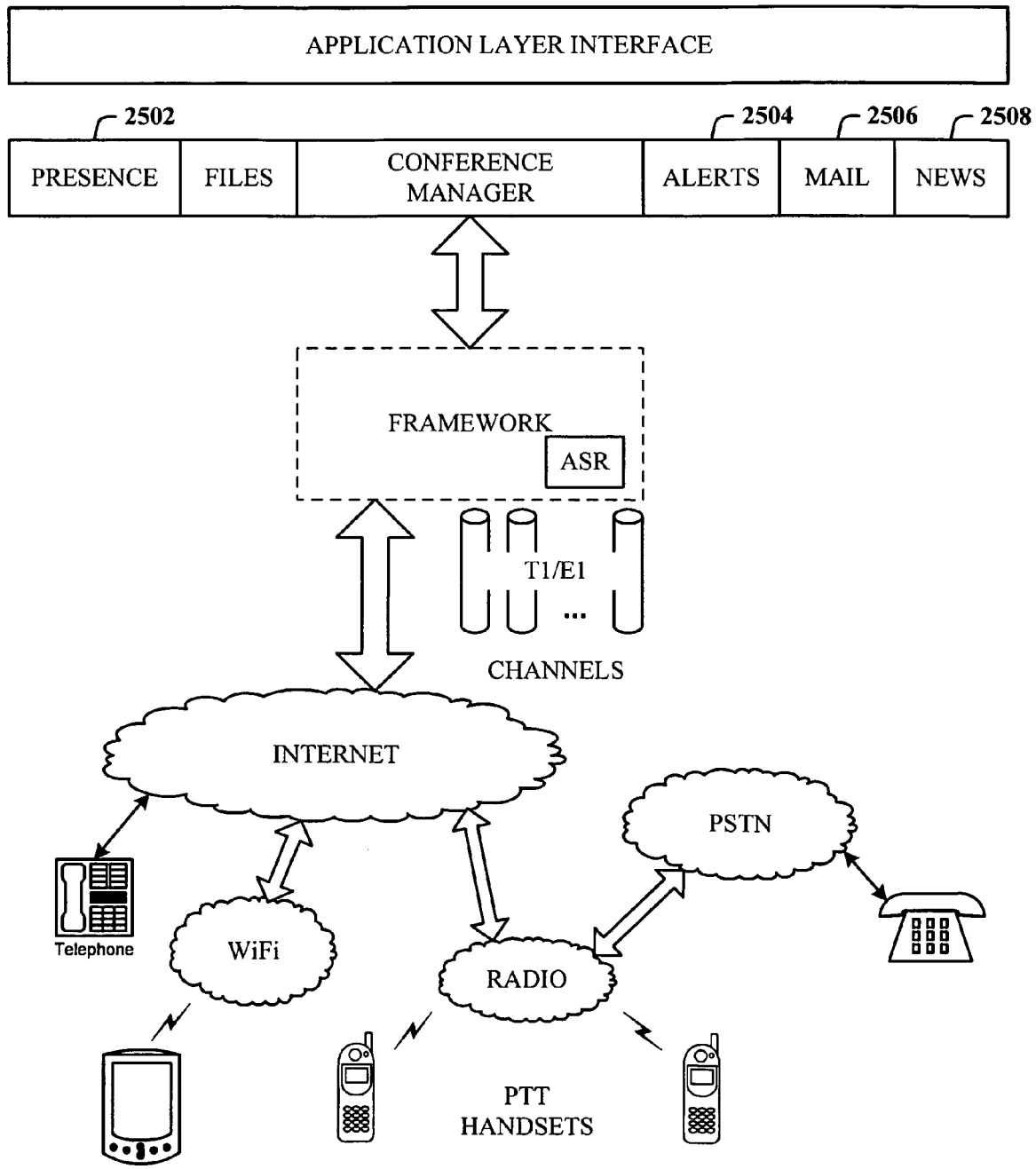
FIG. 25 illustrates a conference management architecture that employs presence processing in accordance with an innovative aspect.

FIG. 25 illustrates a telephony management architecture 2500 that employs presence processing in accordance with an innovative aspect. One of the key requirements in dealing with any emergency situation is the ability to locate a first responder in an area. The notion of "presence" is well established in the Internet and cellular telephone community, but is completely non-existent in the mobile radio (e.g., PTT, or Push-To-Talk radio) community. Presence enables a caller to determine if the called party is in the area, signed-on to the network and what the contact parameters are. Closely allied with the concept of presence is the idea of notification when a party enters or leaves an area where presence is being recorded. Interoperability between military and civilian radios, telephones, cellular phones and other communication devices has been recognized as a vital need capability for natural disasters, attacks, and other related events where security and emergency personnel and assistance are needed. Radio interoperability between civilian and military handsets is currently plagued by at least the following deficiencies: modulation communications schemes such as AM and/or FM, different operational frequency bands, digital versus analog radios, and military spread spectrum and encryption techniques. Recently, Project 25—a narrow band, digital radio for Public Safety Systems was an attempt to arrive at a standard that all parties could use. These handsets proved to be extremely expensive and replacing all of the existing radios with P25 radios is a burden few municipalities can support.

Accordingly, the architecture 2500 includes a presence layer 2502 that facilitates monitoring and detecting the presence of a mobile radio user. Presence includes a database indicating participants, potential participants and their contact information.

Furthermore, an Automatic Speech Recognition (ASR) capability is provided that facilitates signaling by participants who are not equipped with a DTMF generating device.

Alerts/notifications/alarms provide the capability to send a message to interested parties about an event such as arrival of a participant, departure, scheduled activities, etc. An alarm is the "assured delivery" of a special notification indicating a state of heightened emergency. The architecture 2500 attempts to deliver an alarm through any and all possible channels and networks. For example, first responder alarms are never discarded until some delivery notification has been received.

The mechanism used to deliver a notification or alarm may ultimately involve any of the following: SMS message, MMS message, fax message, WAP push web page, recorded voice, video clip and e-mail, for example. In most cases, the business logic preparing an alarm or nonfiction will be unaware of the final physical channel used to deliver the end result. Rendering of the message for each of these channels can require special processing. As indicated architecture provides a confirmed delivery receipt that may be used to notify the sender or as an audit trail, for example.

Each of the various networks associated with the architecture have a different convention for addressing participants engaged in a conference using this network or medium. The address abstraction is an object that can be used by any of the services to indicate the destination for delivery of a notification, alarm, or to manage the participation in a conference. As a participant moves from one network to another, the address object will modify its behavior to fit the requirements of the current network. Additionally, authentication provides a variety of mechanisms for use by services to authenticate participants.

The architecture 2500 also illustrates the use of an alerts layer 2504, a mail layer 2506, and a news layer 2508, each of which facilitate access to the corresponding information. The remaining aspects of the architecture 2500 have been described with respect to the telephony management communications system of FIG. 22.

Figure 26:
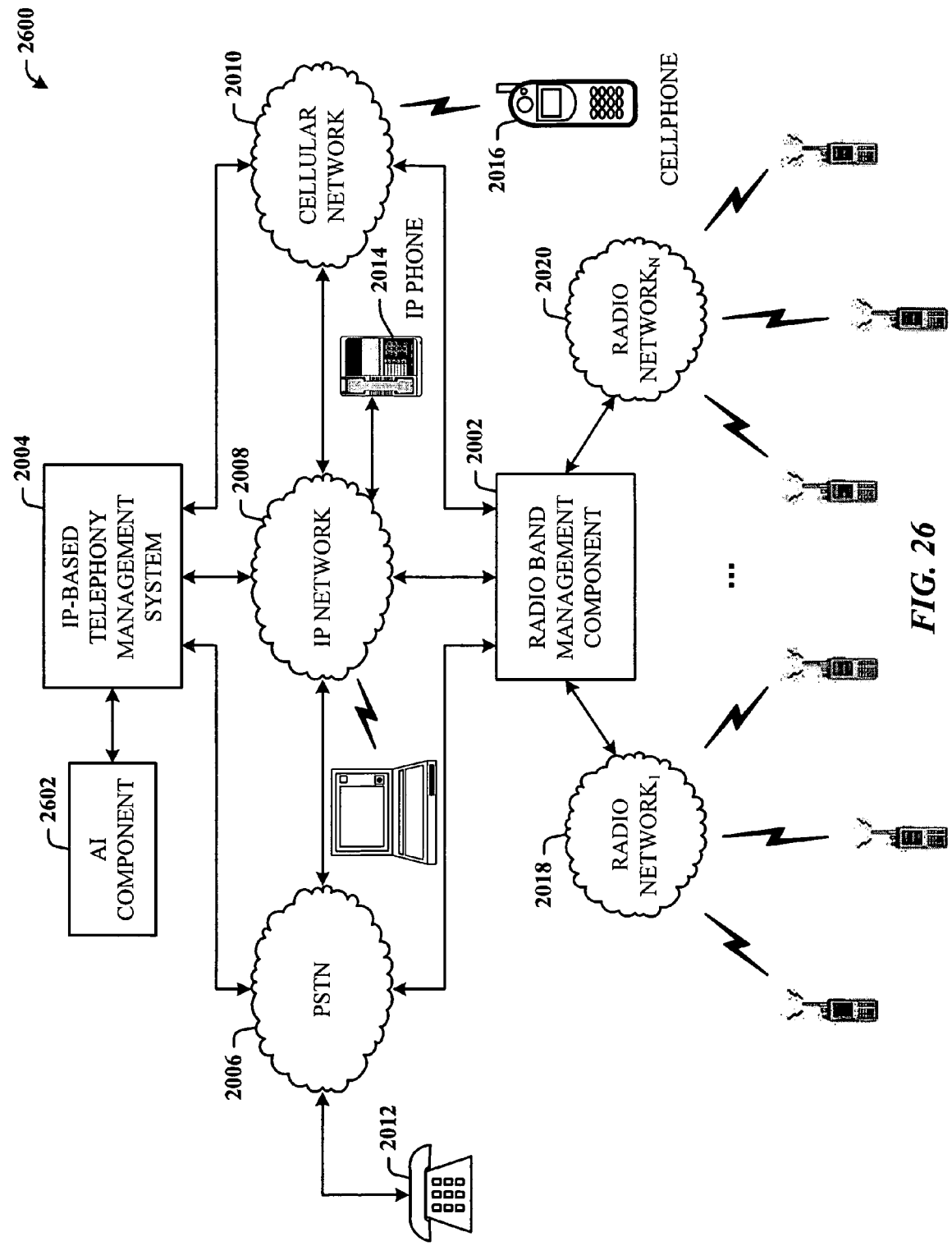
FIG. 26 illustrates a system that employs a machine learning and reasoning component as part of an artificial intelligence component that facilitates automating one or more features in accordance with the subject innovation.

FIG. 26 illustrates a system 2600 that employs a machine learning and reasoning (MLR) component as part of an artificial intelligence (AI) component 2602 that facilitates automating one or more features in accordance with the subject innovation. The subject invention (e.g., in connection with selection) can employ various MLR-based schemes for carrying out various aspects thereof. For example, a process for determining which mobile radio channels to select for a conference session can be facilitated via an automatic classifier system and process.

A classifier is a function that maps an input attribute vector, $x=(x1, x2, x3, x4, xn)$, to a class label class(x). The classifier can also output a confidence that the input belongs to a class, that is, $f(x)=confidence(class(x))$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via learning or training phase within a classifier constructor and feature selection module. Thus, the classifier(s) can be employed to automatically learn and perform a number of functions.

In one implementation, the MLR component can monitor channel selection and session aspects, and automate such aspects when similar events occur in the future. For example, if it is determined that although a list of participants has been pre-specified for such events, yet after repeated occurrence of the event or similar events, that certain mobile radio channels are inactive or not bound into a session, the MLR can automate this to not include these channels and/or participants when a similar future event occurs.

In another example, the MLR component can be configured to search other data sources for phone numbers and/or other related information when an expected participant cannot be reached. This can occur after repeated attempts to call and bind a participant into a session, for example. The MLR component of the AI component 2602 can also be employed to determine at what times data synchronization, searching, and other related system processing can occur, this in view of an event that just occurred. Thus, such processing should not be performed when an event is occurring in order to reserve system resources rather than deplete such resources for overhead-type operations, for example. These are only but a few examples of the flexibility that can be employed by the MLR component. The MLR component can also be applied to other aspects of the radio/telephony interoperability architecture, such as related to selecting a network or networks over which to communicate with session participants and/or radio networks (e.g., cellular, versus IP), choosing IP routes to take in case of network failures during a disaster or event (e.g., satellite versus land-based), and so on.

Figure 27:
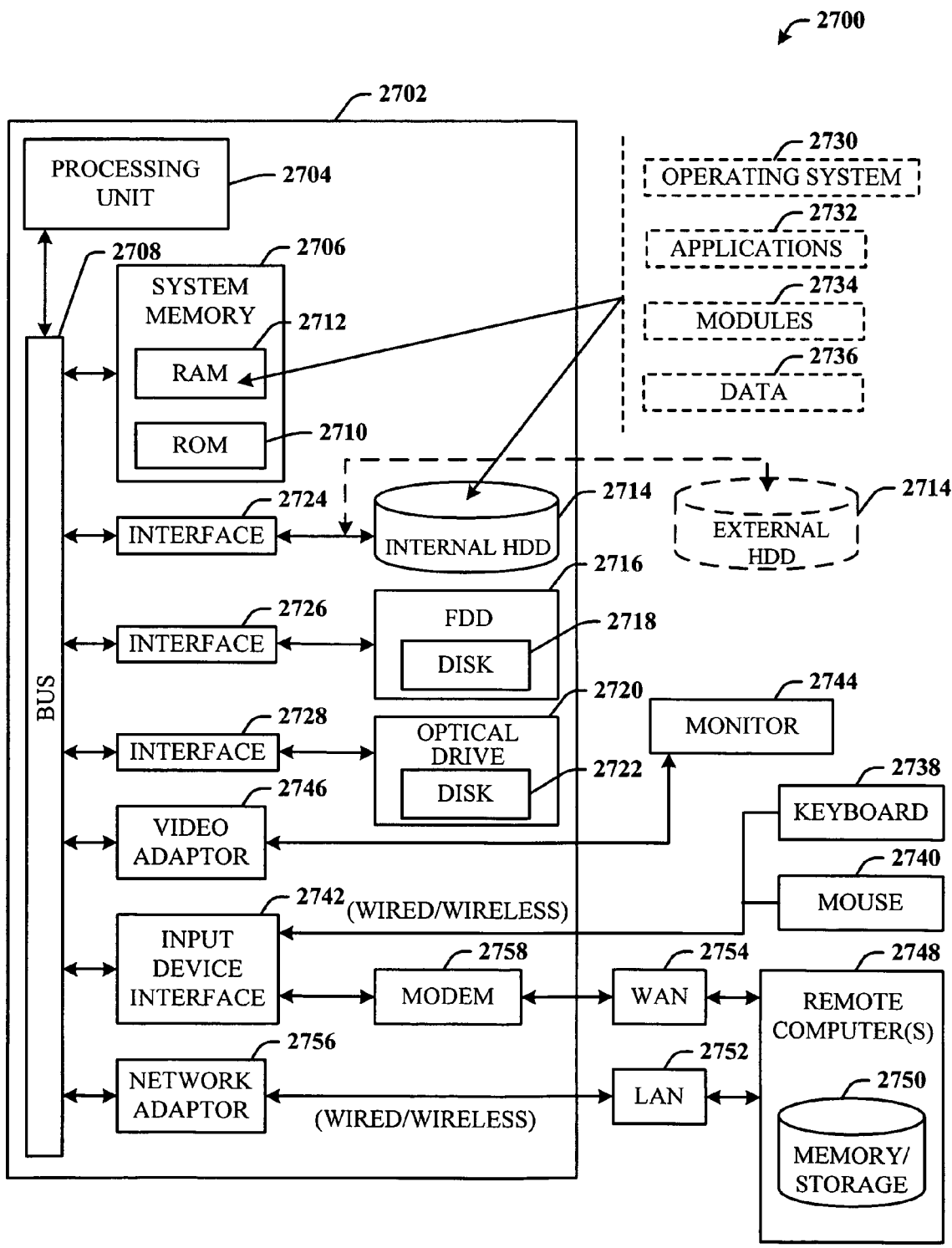
FIG. 27 illustrates a block diagram of a computer operable to execute aspects of the disclosed architecture.

Referring now to FIG. 27, there is illustrated a block diagram of a computer operable to execute aspects of the disclosed architecture. In order to provide additional context for various aspects of the subject invention, FIG. 27 and the following discussion are intended to provide a brief, general description of a suitable computing environment 2700 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 27, there is illustrated an exemplary environment 2700 for implementing various aspects of the invention that includes a computer 2702, the computer 2702 including a processing unit 2704, a system memory 2706 and a system bus 2708. The system bus 2708 couples system components including, but not limited to, the system memory 2706 to the processing unit 2704. The processing unit 2704 can be any of various commercially available processors. Dual microprocessors and other multi-processor architectures may also be employed as the processing unit 2704.

The system bus 2708 can be any of several types of bus structure that may further interconnect to a memory bus (with or without a memory controller), a peripheral bus, and a local bus using any of a variety of commercially available bus architectures. The system memory 2706 includes read only memory (ROM) 2710 and random access memory (RAM) 2712. A basic input/output system (BIOS) is stored in a non-volatile memory 2710 such as ROM, EPROM, EEPROM, which BIOS contains the basic routines that help to transfer information between elements within the computer 2702, such as during start-up. The RAM 2712 can also include a high-speed RAM such as static RAM for caching data.

The computer 2702 further includes an internal hard disk drive (HDD) 2714 (e.g., EIDE, SATA), which internal hard disk drive 2714 may also be configured for external use in a suitable chassis (not shown), a magnetic floppy disk drive (FDD) 2716, (e.g., to read from or write to a removable diskette 2718) and an optical disk drive 2720, (e.g., reading a CD-ROM disk 2722 or, to read from or write to other high capacity optical media such as the DVD). The hard disk drive 2714, magnetic disk drive 2716 and optical disk drive 2720 can be connected to the system bus 2708 by a hard disk drive interface 2724, a magnetic disk drive interface 2726 and an optical drive interface 2728, respectively. The interface 2724 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 2702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 2712, including an operating system 2730, one or more application programs 2732, other program modules 2734 and program data 2736. All or portions of the operating system, applications, modules, and/or data can also be cached in the RAM 2712. It is appreciated that the invention can be implemented with various commercially available operating systems or combinations of operating systems.

A user can enter commands and information into the computer 2702 through one or more wired/wireless input devices, e.g., a keyboard 2738 and a pointing device, such as a mouse 2740. Other input devices (not shown) may include a microphone, an IR remote control, a joystick, a game pad, a stylus pen, touch screen, or the like. These and other input devices are often connected to the processing unit 2704 through an input device interface 2742 that is coupled to the system bus 2708, but can be connected by other interfaces, such as a parallel port, an IEEE 1394 serial port, a game port, a USB port, an IR interface, etc.

A monitor 2744 or other type of display device is also connected to the system bus 2708 via an interface, such as a video adapter 2746. In addition to the monitor 2744, a computer typically includes other peripheral output devices (not shown), such as speakers, printers, etc.

The computer 2702 may operate in a networked environment using logical connections via wired and/or wireless communications to one or more remote computers, such as a remote computer(s) 2748. The remote computer(s) 2748 can be a workstation, a server computer, a router, a personal computer, portable computer, microprocessor-based entertainment appliance, a peer device or other common network node, and typically includes many or all of the elements described relative to the computer 2702, although, for purposes of brevity, only a memory storage device 2750 is illustrated. The logical connections depicted include wired/wireless connectivity to a local area network (LAN) 2752 and/or larger networks, e.g., a wide area network (WAN) 2754. Such LAN and WAN networking environments are commonplace in offices, and companies, and facilitate enterprise-wide computer networks, such as intranets, all of which may connect to a global communication network, e.g., the Internet.

When used in a LAN networking environment, the computer 2702 is connected to the local network 2752 through a wired and/or wireless communication network interface or adapter 2756. The adaptor 2756 may facilitate wired or wireless communication to the LAN 2752, which may also include a wireless access point disposed thereon for communicating with the wireless adaptor 2756.

When used in a WAN networking environment, the computer 2702 can include a modem 2758, or is connected to a communications server on the WAN 2754, or has other means for establishing communications over the WAN 2754, such as by way of the Internet. The modem 2758, which can be internal or external and a wired or wireless device, is connected to the system bus 2708 via the serial port interface 2742. In a networked environment, program modules depicted relative to the computer 2702, or portions thereof, can be stored in the remote memory/storage device 2750. It will be appreciated that the network connections shown are exemplary and other means of establishing a communications link between the computers can be used.

The computer 2702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+Mbps in the 2.4 GHz band. Products can contain more than one band (e.g., dual band), so the networks can provide real-world performance similar to the basic 10BaseT wired Ethernet networks used in many offices.

Figure 28:
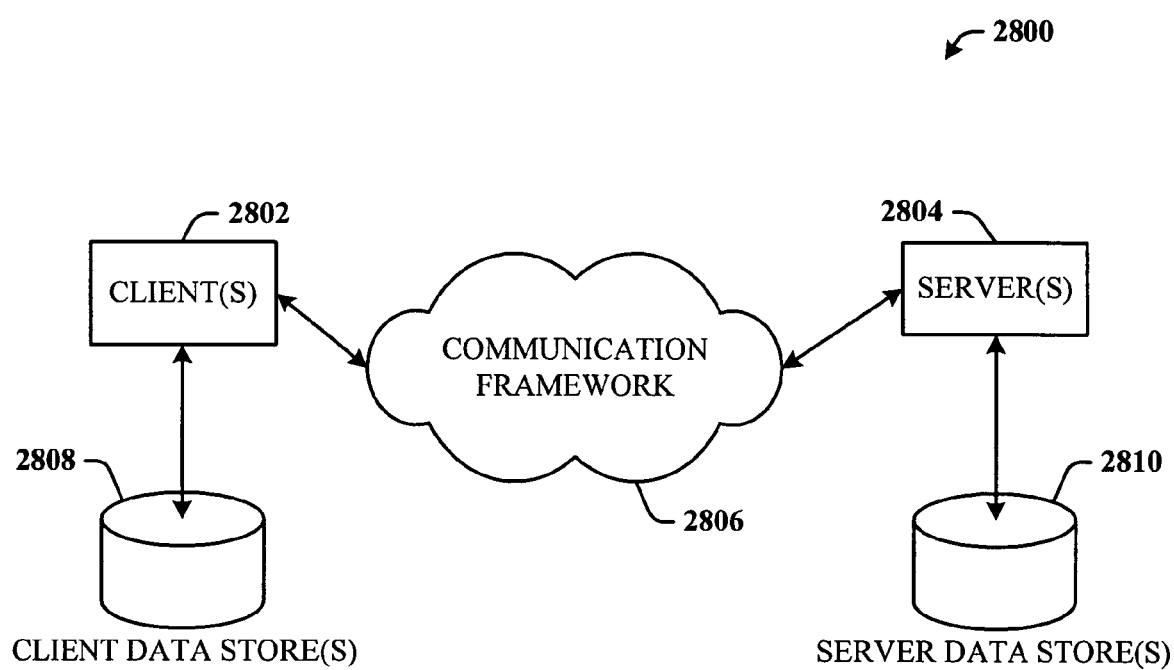
FIG. 28 illustrates a schematic block diagram of an exemplary computing environment in accordance with the subject invention.

Referring now to FIG. 28, there is illustrated a schematic block diagram of an exemplary computing environment 2800 in accordance with the subject invention. The system 2800 includes one or more client(s) 2802. The client(s) 2802 can be hardware and/or software (e.g., threads, processes, computing devices). The client(s) 2802 can house cookie(s) and/or associated contextual information by employing the invention, for example.

The system 2800 also includes one or more server(s) 2804. The server(s) 2804 can also be hardware and/or software (e.g., threads, processes, computing devices). The servers 2804 can house threads to perform transformations by employing the invention, for example. One possible communication between a client 2802 and a server 2804 can be in the form of a data packet adapted to be transmitted between two or more computer processes. The data packet may include a cookie and/or associated contextual information, for example. The system 2800 includes a communication framework 2806 (e.g., a global communication network such as the Internet) that can be employed to facilitate communications between the client(s) 2802 and the server(s) 2804.

Communications can be facilitated via a wired (including optical fiber) and/or wireless technology. The client(s) 2802 are operatively connected to one or more client data store(s) 2808 that can be employed to store information local to the client(s) 2802 (e.g., cookie(s) and/or associated contextual information). Similarly, the server(s) 2804 are operatively connected to one or more server data store(s) 2810 that can be employed to store information local to the servers 2804.

Figure 29:
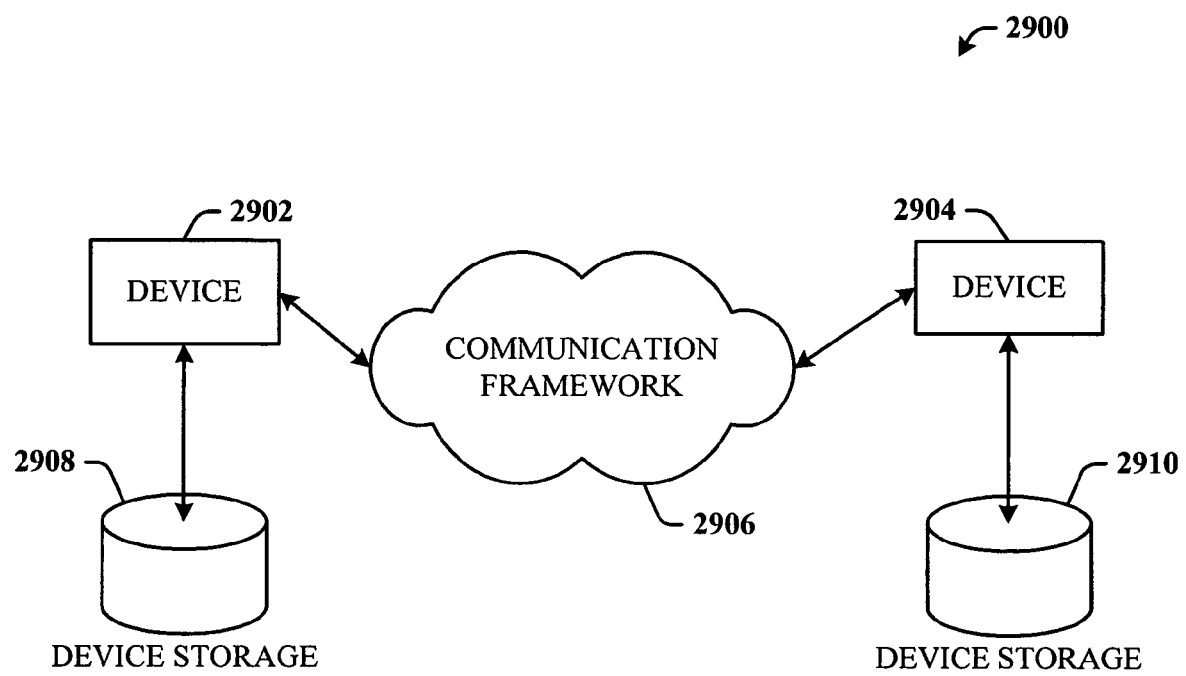
FIG. 29 illustrates a schematic block diagram of an exemplary peer-to-peer environment in accordance with the subject invention.

FIG. 29 illustrates a schematic block diagram of an exemplary peer-to-peer environment 2900 in accordance with the subject invention. The system 2900 can include one or more devices, for example, a first device 2902 and a second device 2904. The subject invention in combination with a peer-to-peer arrangement can facilitate the communications of alerts/notifications, and/or other content between such peer devices via the communications framework 2906 and by utilizing the teleconferencing aspect. For example, the first device 2902 can be a mobile radio and the second device 2904 can be a cell phone. Thus, the devices (2902 and 2904) can be telecommunications devices (e.g., cell phones) as well as computing devices (e.g., portable computers). The devices can also include corresponding device storage (2908 and 2910) that supports the storage of data, messages and/or programs.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of providing communications, comprising:
receiving providing a mobile radio component that facilitates mobile radio communications;
processing access rights for each of the two or more session participants prior to granting access to the session;
creating the teleconferencing session for two or more session participants using a radio/telephony management component;
determining the presence of at least one of the two or more session participants; transmitting a message to the mobile radio component that selects a radio subcomponent;
connecting a mobile radio operator associated with the radio subcomponent to radio/telephony management component in response to receiving the message; and
binding the mobile radio operator into a teleconferencing session.

2. The method of claim 1, further comprising binding into the session a user who is associated with at least one of a city, county, state, police, fire, EMS, medical, and federal security and emergency entities.

3. The method of claim 1, further comprising managing two or more teleconferencing sessions substantially simultaneously.

4. The method of claim 1, wherein the message transmitted to the mobile radio operator is communicated over at least one of an IP network and a cellular network.

5. A system that facilitates communications, comprising:
means for receiving a mobile radio component that facilitates mobile radio communications;
means for creating a teleconferencing session for two or more session participants using a radio/telephony management component;
means for determining the presence of at least one of at least one of the two or more session participants;
means for transmitting a message to the mobile radio component that selects a radio subcomponent;
means for connecting a mobile radio operator associated with the radio subcomponent to radio/telephony management component in response to receiving the message;
means for processing access rights for each of the two or more session participants prior to granting access to the session; and
means for binding the mobile radio operator into a teleconferencing session.

* * * * *